US012563555B2

(12) United States Patent
    Abedini et al.

(10) Patent No.:     US 12,563,555 B2
(45) Date of Patent:     *Feb. 24, 2026

(54) DYNAMIC RESOURCE ALLOCATION IN WIRELESS NETWORK

(71) Applicant: QUALCOMM Incorporated, San Diego, CA (US)

(72) Inventors: Navid Abedini, Basking Ridge, NJ (US); Karl Georg Hampel, Jersey City, NJ (US); Junyi Li, Greentown, PA (US); Sundar Subramanian, San Diego, CA (US); Muhammad Nazmul Islam, Littleton, MA (US); Juergen Cezanne, Ocean Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/669,164

(22) Filed: May 20, 2024

(65) Prior Publication Data

US 2024/0314786 A1     Sep. 19, 2024

Related U.S. Application Data

(63) Continuation of application No. 17/705,104, filed on Mar. 25, 2022, now Pat. No. 11,991,699, which is a
(Continued)

(51) Int. Cl.
    *H04W 72/20*          (2023.01)
    *H04W 16/02*          (2009.01)
    (Continued)

(52) U.S. Cl.
    CPC ........... *H04W 72/20* (2023.01); *H04W 16/28* (2013.01); *H04W 76/10* (2018.02); *H04W 16/02* (2013.01);
    (Continued)

(58) Field of Classification Search
    None
    See application file for complete search history.

(56) References Cited

U.S. PATENT DOCUMENTS

| 11,290,986 B2 | 3/2022 | Abedini et al. |
| 2011/0116432 A1 | 5/2011 | Doppler et al. |
| | (Continued) | |

FOREIGN PATENT DOCUMENTS

| WO | 2016062332 A1 | 4/2016 |
| WO | 2017022870 A1 | 2/2017 |

OTHER PUBLICATIONS

3GPP TSG RAN WG1 NR Ad-Hoc#2 R1-1711614 Qingdao, China, Jun. 27-30, 2017 (Year: 2017).*
(Continued)

*Primary Examiner* — Luna Weissberger
(74) *Attorney, Agent, or Firm* — QUALCOMM Incorporated

(57)          ABSTRACT

Backhaul resources may be allocated to different wireless communication links between different base stations, and local redistribution of resources among base stations may be utilized to account for variations in signal quality and/or variations in traffic experienced by different nodes of the backhaul network. A first access node function (ANF) may determine a need for additional backhaul resources, and may transmit a request message to one or more user equipment functions (UEFs) for additional backhaul resources. A UEF that receives the request message may forward the request to an associated second ANF. The second ANF, if it has backhaul resources available that the first ANF can use, may send a response to the first ANF, via the associated UEF, and the first ANF may use the additional resources that were originally allocated to the second ANF.

20 Claims, 19 Drawing Sheets

Related U.S. Application Data continuation of application No. 16/007,772, filed on Jun. 13, 2018, now Pat. No. 11,290,986.

(60) Provisional application No. 62/530,719, filed on Jul. 10, 2017.

(51) Int. Cl.
| | |
|---|---|
| *H04W 16/10* | (2009.01) |
| *H04W 16/28* | (2009.01) |
| *H04W 76/10* | (2018.01) |
| *H04W 88/08* | (2009.01) |
| *H04W 92/20* | (2009.01) |

(52) U.S. Cl.
CPC ............ *H04W 16/10* (2013.01); *H04W 88/08* (2013.01); *H04W 92/20* (2013.01)

(56) References Cited

U.S. PATENT DOCUMENTS

| | | | |
|---|---|---|---|
| 2013/0107855 A1 | 5/2013 | Takeda et al. | |
| 2016/0119931 A1 | 4/2016 | Soriaga et al. | |
| 2017/0006627 A1* | 1/2017 | Huang .................. | H04W 16/32 |
| 2017/0331577 A1* | 11/2017 | Parkvall .................. | H04W 8/18 |
| 2018/0338335 A1 | 11/2018 | Mukherjee et al. | |
| 2018/0351605 A1 | 12/2018 | Liang et al. | |
| 2018/0359790 A1 | 12/2018 | Ingale et al. | |

| | | |
|---|---|---|
| 2019/0014533 A1 | 1/2019 | Abedini et al. |
| 2019/0014569 A1 | 1/2019 | Abedini et al. |
| 2022/0217703 A1 | 7/2022 | Abedini et al. |

OTHER PUBLICATIONS

Samsung, Dynamic resource allocation for Integrated Access and Backhaul, Jun. 2017, 3GPP TSG RAN WG1 (Year: 2017).*

Ericsson: "Access-Integrated Backhaul", TSG-RAN WG1 #84bis, R1-163220, Apr. 11-15, 2016, 3 Pages.

International Preliminary Report on Patentability—PCT/US2018/037618, The International Bureau of WIPO—Geneva, Switzerland, Jan. 23, 2020 (175250WO).

International Search Report and Written Opinion—PCT/US2018/037618—ISA/EPO—Sep. 14, 2018 (175250WO).

Nokia, et al., "On The Wireless Relay / Self-Backhauling Operation in NR", 3GPP TSG-RAN WG1#86, R1-167267, Aug. 22-26, 2016, 6 Pages.

Qualcomm: "Forward Compatibility Considerations on NR Integrated Access and Backhaul", 3GPP Draft, R1-167119, 3GPP TSG-RAN WG1 #86, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 22, 2016-Aug. 26, 2016, Aug. 13, 2016, XP051142525, pp. 1-6, Aug. 21, 2016.

Taiwan Search Report—TW107120697—TIPO—Dec. 23, 2021 (175250TW).

* cited by examiner

740

715

735     730     720     710     725

705

700

745     740

715

730     735     720     710     725

705

700

745     740     750

715

730     735     725     710     720

705

700

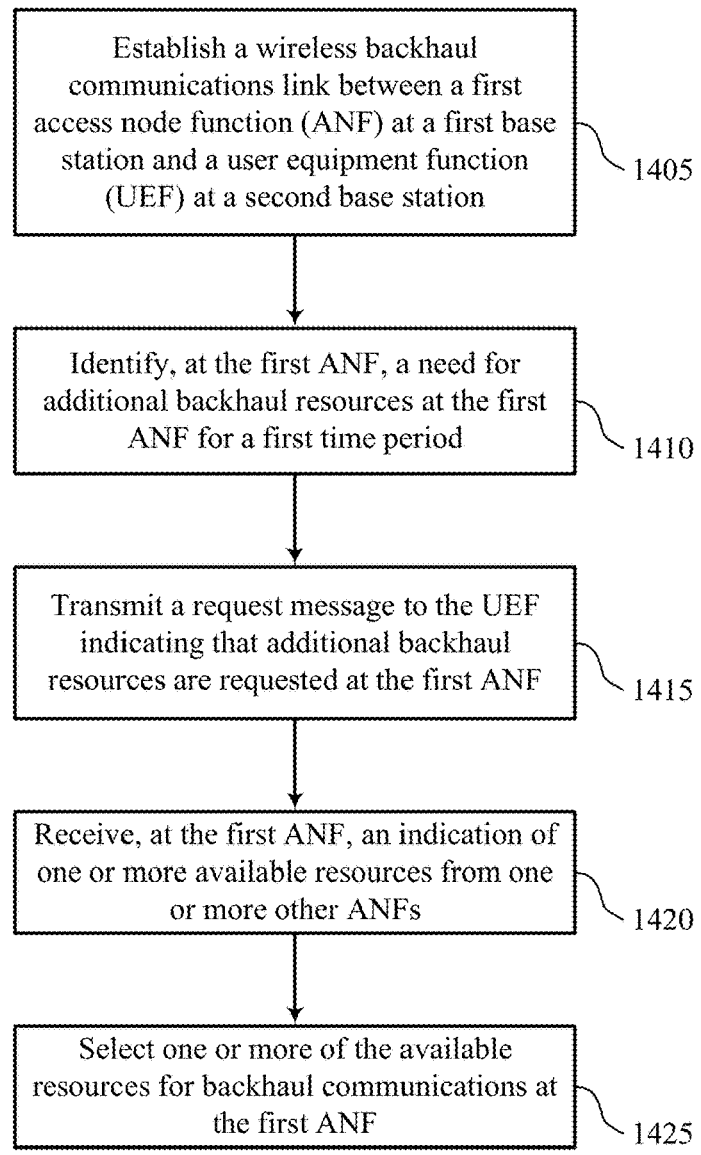

Establish a wireless backhaul communications link between a first access node function (ANF) at a first base station and a user equipment function (UEF) at a second base station

1405

Identify, at the first ANF, a need for additional backhaul resources at the first ANF for a first time period

1410

Transmit a request message to the UEF indicating that additional backhaul resources are requested at the first ANF

1415

Receive, at the first ANF, an indication of one or more available resources from one or more other ANFs

1420

Select one or more of the available resources for backhaul communications at the first ANF

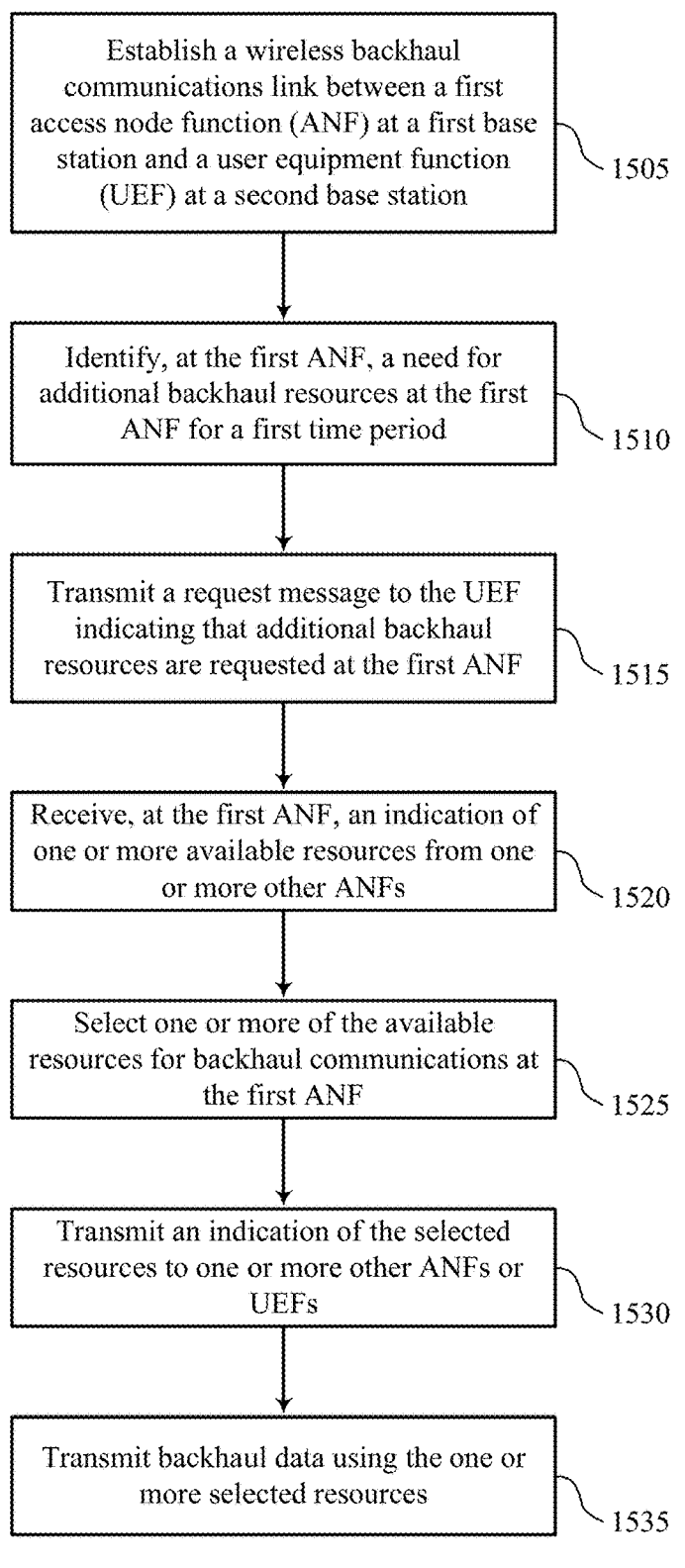

Establish a wireless backhaul communications link between a first access node function (ANF) at a first base station and a user equipment function (UEF) at a second base station

1505

Identify, at the first ANF, a need for additional backhaul resources at the first ANF for a first time period

1510

Transmit a request message to the UEF indicating that additional backhaul resources are requested at the first ANF

1515

Receive, at the first ANF, an indication of one or more available resources from one or more other ANFs

1520

Select one or more of the available resources for backhaul communications at the first ANF

1525

Transmit an indication of the selected resources to one or more other ANFs or UEFs

1530

Transmit backhaul data using the one or more selected resources

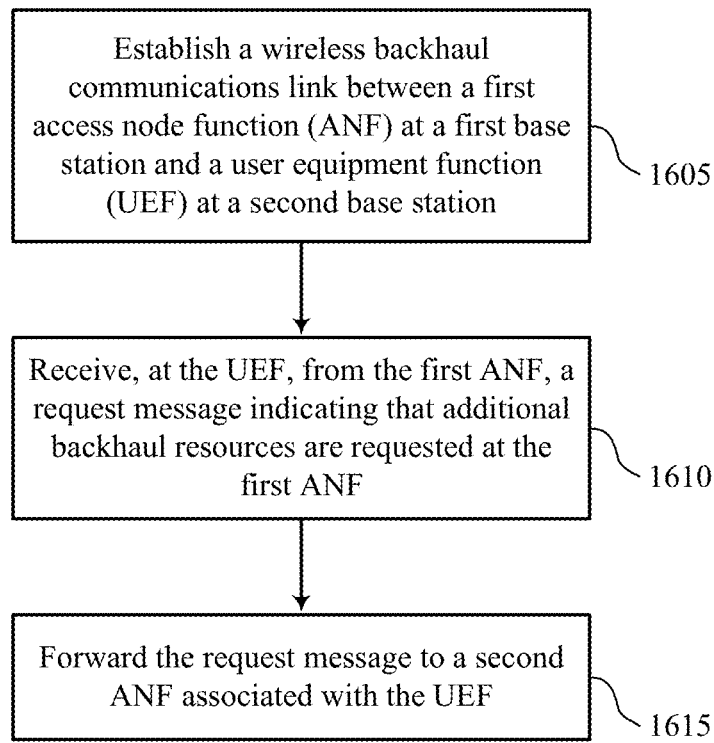

Establish a wireless backhaul communications link between a first access node function (ANF) at a first base station and a user equipment function (UEF) at a second base station

1605

Receive, at the UEF, from the first ANF, a request message indicating that additional backhaul resources are requested at the first ANF

1610

Forward the request message to a second ANF associated with the UEF

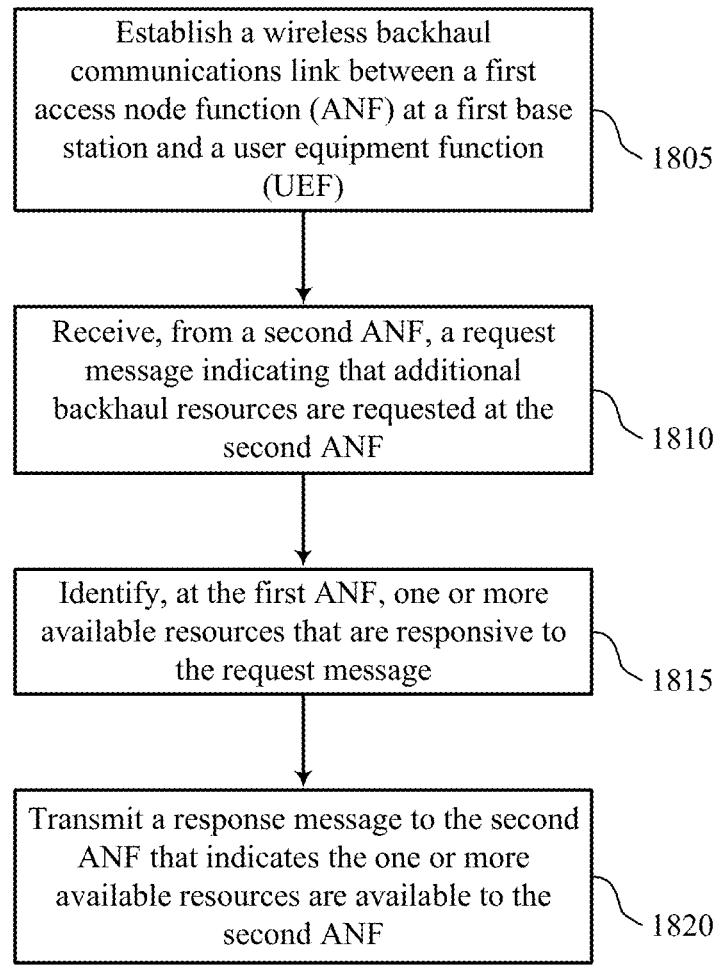

Establish a wireless backhaul communications link between a first access node function (ANF) at a first base station and a user equipment function (UEF)

1805

Receive, from a second ANF, a request message indicating that additional backhaul resources are requested at the second ANF

1810

Identify, at the first ANF, one or more available resources that are responsive to the request message

1815

Transmit a response message to the second ANF that indicates the one or more available resources are available to the second ANF

DYNAMIC RESOURCE ALLOCATION IN WIRELESS NETWORK

CROSS REFERENCES

The present Application for Patent is a continuation of U.S. patent application Ser. No. 17/705,104 by ABEDINI, et al., entitled "DYNAMIC RESOURCE ALLOCATION IN WIRELESS NETWORK," filed Mar. 25, 2022, which is a continuation of U.S. patent application Ser. No. 16/007,772 by ABEDINI, et al., entitled "DYNAMIC RESOURCE ALLOCATION IN WIRELESS NETWORK," filed Jun. 13, 2018, now U.S. Pat. No. 11,290,986, which claims the benefit of U.S. Provisional Patent Application No. 62/530,719 by ABEDINI, et al., entitled "DYNAMIC RESOURCE ALLOCATION IN WIRELESS NETWORK," filed Jul. 10, 2017; each of which is assigned to the assignee hereof, and expressly incorporated by reference herein.

BACKGROUND

The following relates generally to wireless communication, and more specifically to dynamic resource allocation in wireless network.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of access nodes, each simultaneously supporting communication for multiple communication devices, which may be otherwise known as user equipment (UE).

Wireless communications systems may include access nodes to facilitate wireless communication between user equipment and a network. For example, an LTE base station may provide a mobile device access to the internet via the LTE wireless network. Access nodes typically have a high-capacity, wired, backhaul connection (e.g., fiber) to the network. In some deployments, however, it may be desirable to deploy a larger number of access nodes in a small area to provide acceptable coverage to users. In such deployments, it may be impracticable to connect each access node to the network via a wired connection.

SUMMARY

The described techniques provide for a backhaul network that may be established between access nodes and/or base stations. Backhaul resources may be allocated to different wireless communication links between different base stations, and in some cases local redistribution of resources among base station may be utilized to account for variations in signal quality and/or variations in traffic experienced by different nodes of the backhaul network. In some cases, access node functions (ANFs) and user equipment functions (UEFs) may be configured at base stations, and backhaul resources may be allocated between ANFs and one or more UEFs, in which the ANF may provide access to a high-capacity wired connection to a UEF. In cases where a first ANF determines a need for additional backhaul resources, the first ANF may transmit a request message to one or more UEFs for additional backhaul resources. A UEF that receives the request message may forward the request to an associated second ANF. The second ANF, if it has backhaul resources available that the first ANF can use, may send a response to the first ANF, via the associated UEF, and the first ANF may use the additional resources that were originally allocated to the second ANF. In some cases, the backhaul resources may be time resources, frequency resources, code resources, spatial resources (e.g., directional transmission beams), or any combinations thereof.

A method of wireless communication is described. The method may include establishing a wireless backhaul communications link between a first access node function (ANF) at a first base station and a user equipment function (UEF) at a second base station, identifying, at the first ANF, a need for additional backhaul resources at the first ANF for a first time period, transmitting a request message to the UEF indicating that additional backhaul resources are requested at the first ANF, receiving, at the first ANF, an indication of one or more available resources from one or more other ANFs, and selecting one or more of the available resources for backhaul communications at the first ANF.

An apparatus for wireless communication is described. The apparatus may include means for establishing a wireless backhaul communications link between a first access node function (ANF) at a first base station and a user equipment function (UEF) at a second base station, means for identifying, at the first ANF, a need for additional backhaul resources at the first ANF for a first time period, means for transmitting a request message to the UEF indicating that additional backhaul resources are requested at the first ANF, means for receiving, at the first ANF, an indication of one or more available resources from one or more other ANFs, and means for selecting one or more of the available resources for backhaul communications at the first ANF.

Another apparatus for wireless communication is described. The apparatus may include a processor, memory in electronic communication with the processor, and instructions stored in the memory. The instructions may be operable to cause the processor to establish a wireless backhaul communications link between a first access node function (ANF) at a first base station and a user equipment function (UEF) at a second base station, identify, at the first ANF, a need for additional backhaul resources at the first ANF for a first time period, transmit a request message to the UEF indicating that additional backhaul resources are requested at the first ANF, receive, at the first ANF, an indication of one or more available resources from one or more other ANFs, and select one or more of the available resources for backhaul communications at the first ANF.

A non-transitory computer readable medium for wireless communication is described. The non-transitory computer-readable medium may include instructions operable to cause a processor to establish a wireless backhaul communications link between a first access node function (ANF) at a first base station and a user equipment function (UEF) at a second base station, identify, at the first ANF, a need for additional backhaul resources at the first ANF for a first time period, transmit a request message to the UEF indicating that additional backhaul resources are requested at the first ANF, receive, at the first ANF, an indication of one or more available resources from one or more other ANFs, and select one or more of the available resources for backhaul communications at the first ANF.

In some examples of the method, apparatus, and non-transitory computer-readable medium described above, the transmitting the request message comprises formatting a request indication in a control channel configured in the wireless backhaul communications link. In some examples of the method, apparatus, and non-transitory computer-readable medium described above, the control channel comprises resources that may be pre-allocated among a plurality of ANFs and a plurality of UEFs.

In some examples of the method, apparatus, and non-transitory computer-readable medium described above, the request message may be transmitted in an uplink control channel or a downlink control channel. In some examples of the method, apparatus, and non-transitory computer-readable medium described above, the selecting one or more of the available resources comprises selecting one or more of time-multiplexed resources, frequency multiplexed resources, code division multiplexed resources, spatially multiplexed resources, or any combination thereof.

In some examples of the method, apparatus, and non-transitory computer-readable medium described above, the available resources comprise resources on one or more directional transmission beams, and wherein the spatially multiplexed resource comprise resources on one or more of the directional transmission beams. Some examples of the method, apparatus, and non-transitory computer-readable medium described above may further include processes, features, means, or instructions for transmitting an indication of the selected resources to one or more other ANFs or UEFs. Some examples of the method, apparatus, and non-transitory computer-readable medium described above may further include processes, features, means, or instructions for transmitting backhaul data using the one or more selected resources. In some examples of the method, apparatus, and non-transitory computer-readable medium described above, the request message may be forwarded by the UEF to a second ANF associated with the UEF, and wherein the indication may be received from the second ANF.

Some examples of the method, apparatus, and non-transitory computer-readable medium described above may further include processes, features, means, or instructions for identifying a second ANF collocated at the first base station with the first ANF. Some examples of the method, apparatus, and non-transitory computer-readable medium described above may further include processes, features, means, or instructions for transmitting the request message to a second ANF. Some examples of the method, apparatus, and non-transitory computer-readable medium described above may further include processes, features, means, or instructions for identifying a second UEF collocated at the first base station with the first ANF. Some examples of the method, apparatus, and non-transitory computer-readable medium described above may further include processes, features, means, or instructions for transmitting the request message to the second UEF. In some examples of the method, apparatus, and non-transitory computer-readable medium described above, the request message includes an indication of a type of resources requested by the first ANF.

A method of wireless communication is described. The method may include establishing a wireless backhaul communications link between a first access node function (ANF) at a first base station and a user equipment function (UEF) at a second base station, receiving, at the UEF, from the first ANF, a request message indicating that additional backhaul resources are requested at the first ANF, and forwarding the request message to a second ANF associated with the UEF.

An apparatus for wireless communication is described. The apparatus may include means for establishing a wireless backhaul communications link between a first access node function (ANF) at a first base station and a user equipment function (UEF) at a second base station, means for receiving, at the UEF, from the first ANF, a request message indicating that additional backhaul resources are requested at the first ANF, and means for forwarding the request message to a second ANF associated with the UEF.

Another apparatus for wireless communication is described. The apparatus may include a processor, memory in electronic communication with the processor, and instructions stored in the memory. The instructions may be operable to cause the processor to establish a wireless backhaul communications link between a first access node function (ANF) at a first base station and a user equipment function (UEF) at a second base station, receive, at the UEF, from the first ANF, a request message indicating that additional backhaul resources are requested at the first ANF, and forward the request message to a second ANF associated with the UEF.

A non-transitory computer readable medium for wireless communication is described. The non-transitory computer-readable medium may include instructions operable to cause a processor to establish a wireless backhaul communications link between a first access node function (ANF) at a first base station and a user equipment function (UEF) at a second base station, receive, at the UEF, from the first ANF, a request message indicating that additional backhaul resources are requested at the first ANF, and forward the request message to a second ANF associated with the UEF.

Some examples of the method, apparatus, and non-transitory computer-readable medium described above may further include processes, features, means, or instructions for receiving, from the second ANF, an indication of one or more available resources. Some examples of the method, apparatus, and non-transitory computer-readable medium described above may further include processes, features, means, or instructions for forwarding the indication to the first ANF. In some examples of the method, apparatus, and non-transitory computer-readable medium described above, the forwarding the request message comprises determining to forward the request message to the second ANF via a wireless backhaul link with the second ANF or to forward the request message to the second ANF that may be collocated with the UEF at the second base station.

In some examples of the method, apparatus, and non-transitory computer-readable medium described above, the request message includes a request for one or more of time-multiplexed resources, frequency multiplexed resources, code division multiplexed resources, spatially multiplexed resources, or any combination thereof. In some examples of the method, apparatus, and non-transitory computer-readable medium described above, the requested resources comprise resources on one or more directional transmission beams, and wherein the spatially multiplexed resource comprise resources on one or more of the directional transmission beams.

Some examples of the method, apparatus, and non-transitory computer-readable medium described above may further include processes, features, means, or instructions for receiving an indication of the selected resources from the first ANF. Some examples of the method, apparatus, and non-transitory computer-readable medium described above may further include processes, features, means, or instructions for forwarding the indication of the selected resources to the second ANF. In some examples of the method, apparatus, and non-transitory computer-readable medium described above, the request message may be transmitted in an uplink control channel or a downlink control channel. In some examples of the method, apparatus, and non-transitory computer-readable medium described above, the request message may be received on an uplink control channel or a downlink control channel configured in the wireless backhaul communications link. In some examples of the method, apparatus, and non-transitory computer-readable medium described above, the uplink control channel and downlink control channel comprise resources that may be pre-allocated among a plurality of ANFs and a plurality of UEFs.

A method of wireless communication is described. The method may include establishing a wireless backhaul communications link between a first access node function (ANF) at a first base station and a user equipment function (UEF), receiving, from a second ANF, a request message indicating that additional backhaul resources are requested at the second ANF, identifying, at the first ANF, one or more available resources that are responsive to the request message, and transmitting a response message to the second ANF that indicates the one or more available resources are available to the second ANF.

An apparatus for wireless communication is described. The apparatus may include means for establishing a wireless backhaul communications link between a first access node function (ANF) at a first base station and a user equipment function (UEF), means for receiving, from a second ANF, a request message indicating that additional backhaul resources are requested at the second ANF, means for identifying, at the first ANF, one or more available resources that are responsive to the request message, and means for transmitting a response message to the second ANF that indicates the one or more available resources are available to the second ANF.

Another apparatus for wireless communication is described. The apparatus may include a processor, memory in electronic communication with the processor, and instructions stored in the memory. The instructions may be operable to cause the processor to establish a wireless backhaul communications link between a first access node function (ANF) at a first base station and a user equipment function (UEF), receive, from a second ANF, a request message indicating that additional backhaul resources are requested at the second ANF, identify, at the first ANF, one or more available resources that are responsive to the request message, and transmit a response message to the second ANF that indicates the one or more available resources are available to the second ANF.

A non-transitory computer readable medium for wireless communication is described. The non-transitory computer-readable medium may include instructions operable to cause a processor to establish a wireless backhaul communications link between a first access node function (ANF) at a first base station and a user equipment function (UEF), receive, from a second ANF, a request message indicating that additional backhaul resources are requested at the second ANF, identify, at the first ANF, one or more available resources that are responsive to the request message, and transmit a response message to the second ANF that indicates the one or more available resources are available to the second ANF.

In some examples of the method, apparatus, and non-transitory computer-readable medium described above, the receiving comprises receiving the request message from the UEF, wherein the UEF may be established at a second base station and the second ANF may be established at a third base station. In some examples of the method, apparatus, and non-transitory computer-readable medium described above, the receiving comprises receiving the request message from the UEF, wherein the UEF may be established at the first base station. In some examples of the method, apparatus, and non-transitory computer-readable medium described above, the receiving comprises receiving the request message from the second ANF, wherein the second ANF may be established at the first base station. In some examples of the method, apparatus, and non-transitory computer-readable medium described above, the request message may be transmitted in an uplink control channel or a downlink control channel.

Some examples of the method, apparatus, and non-transitory computer-readable medium described above may further include processes, features, means, or instructions for receiving an indication of one or more selected resources of the available resources from the second ANF. Some examples of the method, apparatus, and non-transitory computer-readable medium described above may further include processes, features, means, or instructions for refraining from transmitting backhaul data using the one or more selected resources.

BRIEF DESCRIPTION OF THE DRAWINGS

FIGS. 14 through 19 illustrate methods for dynamic resource allocation in wireless network in accordance with aspects of the present disclosure.

DETAILED DESCRIPTION

Figure 1:
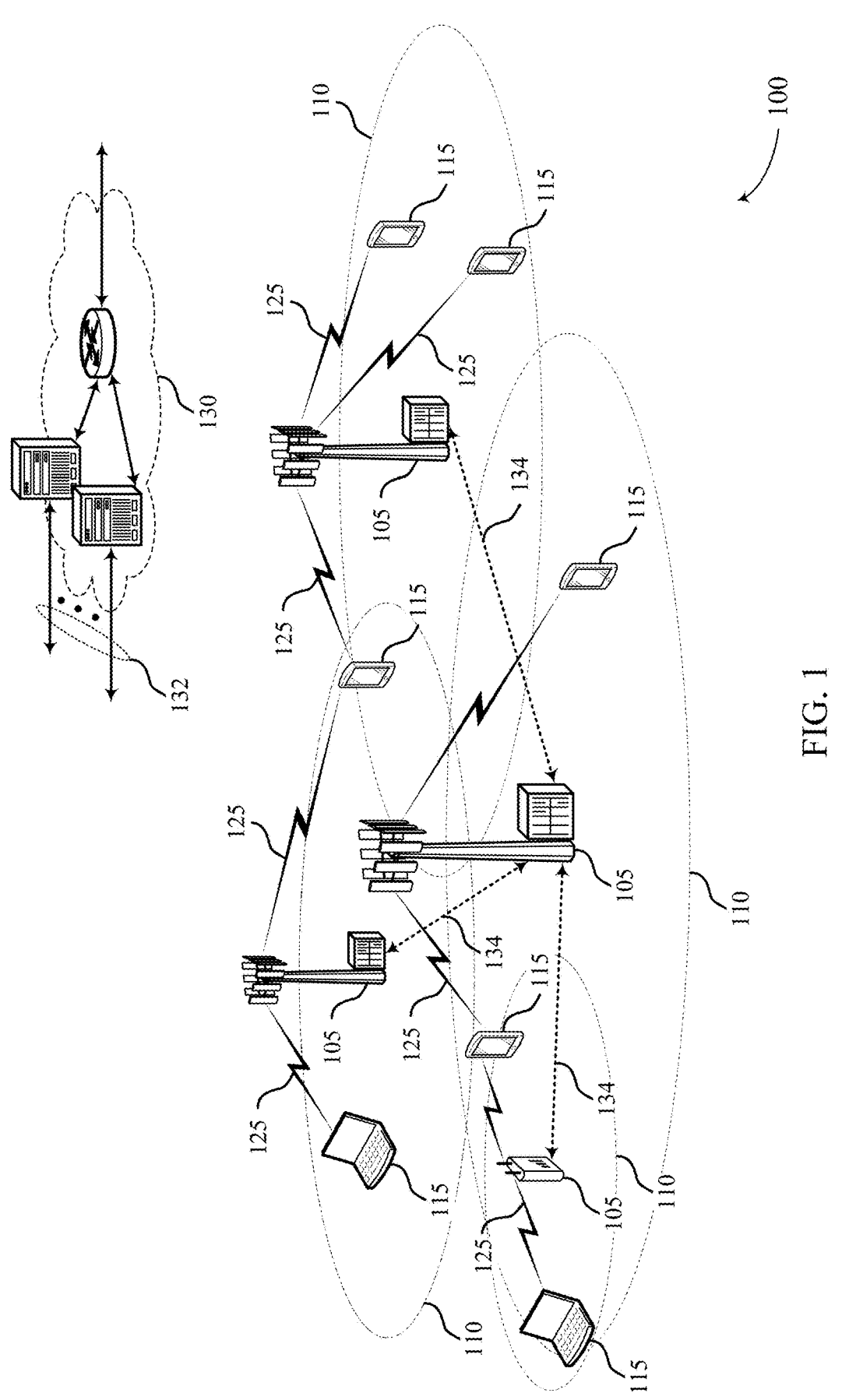
FIG. 1 illustrates an example of a system for wireless communication that supports dynamic resource allocation in wireless network in accordance with aspects of the present disclosure.

According to some aspects of the disclosure, wireless backhaul links may be used to couple an access node (AN) to a network in place of high-capacity, wired backhaul link (e.g., fiber). An AN may be a base station in a wireless communications system, for example, although other network devices may serve as an AN (e.g., a user equipment (UE) in a peer-to-peer or device-to-device communication system may serve as an AN). In some systems, a first AN may establish a wireless backhaul link to a second AN, which may have a high-capacity, wired backhaul link. In this manner, the first AN may communicate access traffic to the network via the second AN through the combination of the wireless backhaul link and the wired backhaul link (e.g., a multi-hop link). In some examples, a backhaul network may use multiple wireless backhaul links before reaching a wired backhaul link. The backhaul network may also provide robustness via topological redundancy. In such networks, backhaul resources may be allocated to different wireless communication links between different ANs or base stations.

In some cases, an AN may determine that its allocated backhaul resources may be insufficient to support traffic needs for certain periods of time, due to, for example, local variations in load or channel conditions. Techniques are described herein that provide local redistribution of resources among ANs or base stations, and may be utilized to account for variations in signal quality and/or variations in traffic experienced by different nodes of the backhaul network.

In some cases, access node functions (ANFs) and user equipment functions (UEFs) may be configured at nodes (e.g., base stations) in a backhaul system, and backhaul resources may be allocated between ANFs and one or more UEFs, in which the ANF may provide access to a high-capacity wired connection to a UEF, either directly or through another ANF. In cases where a first ANF determines a need for additional backhaul resources, the first ANF may transmit a request message to one or more UEFs for additional backhaul resources. A UEF that receives the request message may forward the request to an associated second ANF. The second ANF, if it has backhaul resources available that the first ANF can use, may send a response to the first ANF, via the associated UEF, and the first ANF may use the additional resources that were originally allocated to the second ANF. In some cases, the backhaul resources may be time resources, frequency resources, code resources, spatial resources (e.g., directional transmission beams), or any combinations thereof.

Thus, when load conditions change or when the network topology changes, e.g. due to changes in channel conditions, link failure or addition/departure of nodes, the resources may be redistributed to swiftly and locally shift resources in response to availability and demand.

To reduce interference with other signals, frequencies different from those used for the access network may be used to establish wireless backhaul links. In another example, the same frequencies may be used for both access and backhaul network (e.g., in an integrated access and backhaul (IAB)

network, or a self-backhauling network). For example, millimeter waves, such as those used in 5G cellular technologies, may be used to establish wireless backhaul links between ANFs and UEFs. In addition, beamforming techniques may be used to direct a wireless communication link to a neighboring AN. It should be appreciated that wireless links between ANs are suitable for beamforming techniques because ANs are stationary (i.e., they do not change physical locations) and ANs may have large antenna arrays that may be capable of producing highly focused pencil beams.

Aspects of the disclosure are initially described in the context of a wireless communications system. Aspects of the disclosure are further illustrated by and described with reference to apparatus diagrams, system diagrams, and flowcharts that relate to dynamic resource allocation in a wireless network.

FIG. 1 illustrates an example of a wireless communications system 100 in accordance with various aspects of the present disclosure. The wireless communications system 100 includes base stations or access nodes 105, UEs 115, and a core network 130. In some examples, the wireless communications system 100 may be a 5G, LTE, or LTE-Advanced network. Wireless communications system 100 may support one or more node functions that enable resource allocation and scheduling between access nodes 105.

Access nodes 105 may wirelessly communicate with UEs 115 via one or more access node antennas. Each access node 105 may provide communication coverage for a respective geographic coverage area 110. Communication links 125 shown in wireless communications system 100 may include UL transmissions from a UE 115 to an access node 105, or DL transmissions, from an access node 105 to a UE 115. UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

Access nodes 105 may communicate with the core network 130 and with one another. For example, access nodes 105 may interface with the core network 130 through a first set of backhaul links 132 (e.g., S1, etc.). Access nodes 105 may communicate with one another over a second set of backhaul links 134 (e.g., X2, etc.) either directly or indirectly (e.g., through core network 130). Such backhaul links 134 may be wired or wireless. In addition, such backhaul links may form a backhaul network to relay traffic from a UEF at an originating access node 105 to an ANF at an access node 105 with a wired connection to the desired network. Access nodes 105 may perform radio configuration and scheduling for communication with UEs 115, or may operate under the control of an access node controller (not shown). In some examples, access nodes 105 may be macro cells, small cells, hot spots, or the like. Access nodes 105 may also be referred to as eNodeBs (eNBs) 105.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include CDMA systems, TDMA systems, FDMA systems, and OFDMA systems. A wireless multiple-access communications system may include a number of access nodes, each simultaneously supporting communication for one or more multiple communication devices, which may be otherwise known as a user equipment (UE).

Some wireless communications systems may operate in millimeter wave (mmW) frequency ranges, e.g., 28 GHz, 40 GHz, 60 GHz, etc. Wireless communication at these frequencies may be associated with increased signal attenuation, e.g., path loss, which may also be influenced by various factors, such as temperature, barometric pressure, diffraction, etc. As a result, signal processing techniques, such as beamforming, may be used to coherently combine energy and overcome path losses at these frequencies. Further, wireless communication links achieved through beamforming may be associated with narrow beams (e.g., "pencil beams") that are highly directional, minimize inter-link interference, and provide high-bandwidth links between access nodes. Dynamic beam-steering and beam-search capabilities may further support, for example, discovery, link establishment, and beam refinement in the presence of dynamic shadowing and Rayleigh fading. Additionally, communication in such mmW systems may be time division multiplexed, where a transmission may be directed to one wireless device at a time due to the directionality of the transmitted signal.

Wireless communications networks may employ backhaul links (e.g., backhaul link 132 or backhaul link 134) as a connection between a core network and wireless nodes within the wireless communications network. For example, wireless communications system 100 may include multiple access nodes 105 (e.g., base stations, remote radio heads, etc.), where at least one access node 105 is coupled to a wireline backhaul link, such as an optical fiber cable. However, due to the widespread deployment of access nodes 105 within a given region, installing wireline backhaul links to each access node 105 within a network may be cost prohibitive. Therefore, some of the access nodes 105 within wireless communications system 100 may not be directly coupled to the core network 130 or to another access node 105 via a wired backhaul link, and may use other means, such as wireless backhaul links, to communicate backhaul traffic. For instance, cellular RATs may be used to provide backhaul links between multiple access nodes 105 and a core network 130. In such cases, the access nodes 105 may wirelessly communicate backhaul access traffic to a high-capacity fiber point (e.g., a location where a wireless node is coupled with a wireline link to core network 130).

While mobile access may sometimes be associated with single-hop communication links between a source and destination (e.g., an asymmetric link), wireless backhaul communications may support multi-hop transport and provide robustness through topological redundancy (e.g., alternative paths for data exchange within a wireless communications network). Accordingly, underlying links using wireless backhaul communications may be symmetric in nature and use large-scale resource coordination among the wireless communication links.

In some cases, cellular RATs, such as mmW-based RATs, may be used to support access traffic between UEs 115 and access nodes 105, in addition to backhaul access traffic among multiple access nodes 105. Moreover, both access and backhaul traffic may share the same resources (e.g., as in the case of integrated access and backhaul (IAB)). Such wireless backhaul or IAB solutions may be increasingly beneficial with the evolution of cellular technologies due to enhancements in wireless link capacity and reduction in latency. Further, the use of wireless backhaul links may reduce the cost of dense small cell deployments.

In some cases, an access link using a mmW-based RAT may be designed as an asymmetric single-hop link, which may be used for assigning control and scheduling tasks to an access node 105 while providing instruction to one or more UEs 115 for scheduling communication. In such cases, an access node 105 may coordinate wireless resources among multiple UEs 115, while each UE 115 may be assigned to one access node 105 at a time. In some cases, inter-access node links may be symmetric in nature and may form mesh topologies for enhanced robustness, where wireless transport may occur along multiple hops.

Thus, using a RAT may enable wireless backhaul communication using one or more node functions at a wireless node, such as a base station or access node. Additionally, multiple wireless nodes may communicate in a backhaul network using a schedule that is aligned with a frame structure. For example, a wireless node may establish a link with different wireless nodes using a RAT that supports a synchronized frame structure, such as a mmW RAT. The wireless nodes may instantiate one or more node functions, such as an ANF and a UEF. The wireless nodes may then communicate according to active and suspended modes using the node functions, where the communication is based on a schedule aligned with the frame structure.

In addition, occupancy/availability signaling may be used to enable dynamic resource allocation of the resources defined in the synchronized frame structure between different wireless communication links. In some cases, a first ANF may determine a need for additional backhaul resources, and may transmit a request message to one or more UEFs for additional backhaul resources. A UEF that receives the request message may forward the request to an associated second ANF. The second ANF, if it is not using some of its dedicated resources, may signal to the first ANF, via the UEF for example, that such resources are available to be used. Upon receiving the response from the second ANF, the first ANF may schedule data to be transmitted using those available resources. The first ANF may transmit an indication back to the second ANF that all or a subset of the second ANF's available resources have been selected, and the second ANF may refrain from using the selected resources. In some cases, the backhaul resources may be time resources, frequency resources, code resources, spatial resources (e.g., directional transmission beams), or any combinations thereof.

Figure 2:
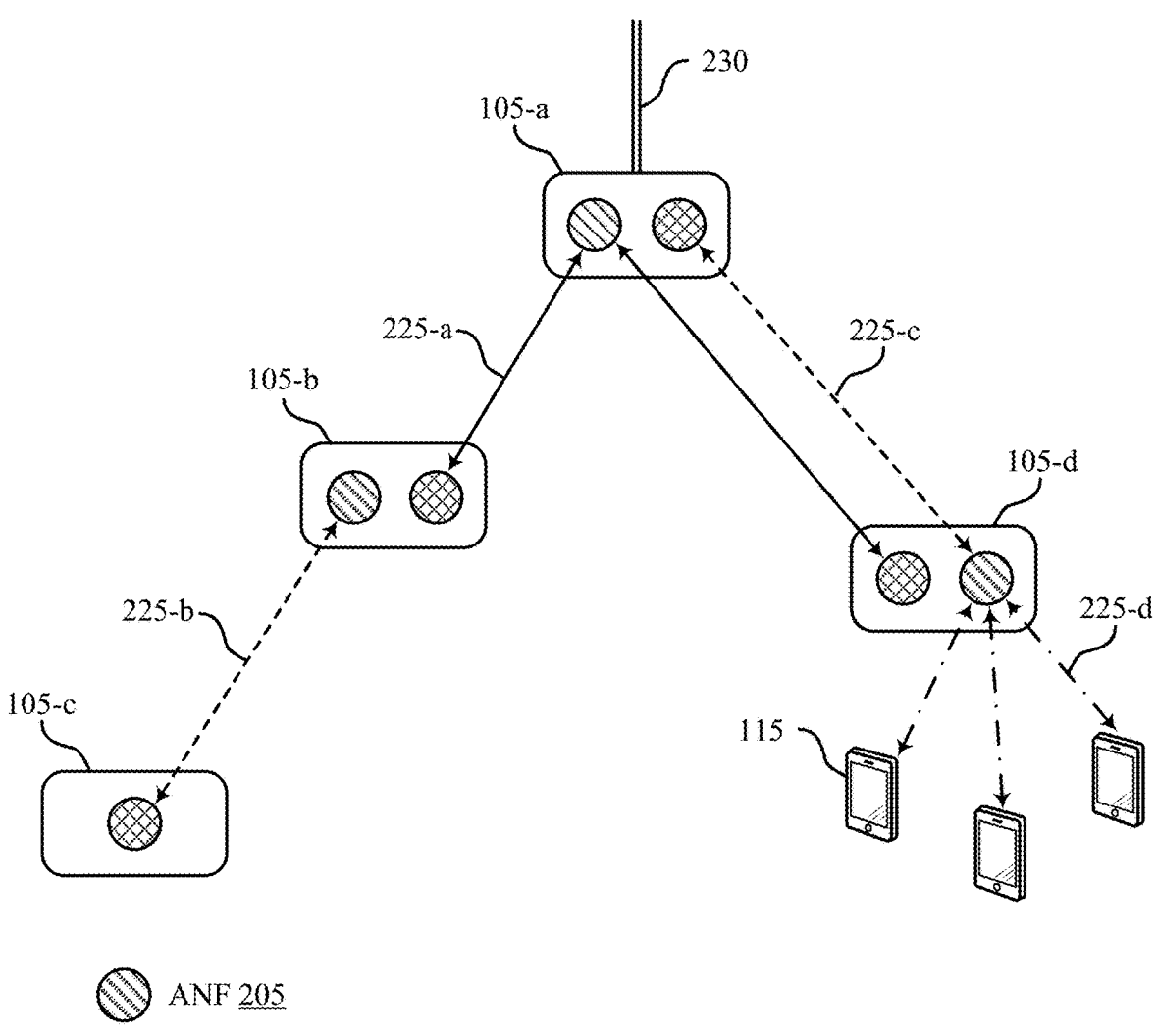
FIG. 2 illustrates an example of a communications network that supports dynamic resource allocation in a wireless network in accordance with aspects of the present disclosure.

FIG. 2 illustrates an example of a backhaul network 200 for dynamic resource allocation in a wireless network. In some cases, backhaul network 200 may be an example of a wireless communications network that communicates using mmW frequency ranges. The backhaul network 200 may include a number of access nodes 105 that communicate over a number of different communication links 225, where the communication links 225 may be associated with a same or different set of wireless resources. The access nodes 105 may be examples of the access nodes 105 described in reference to FIG. 1. The backhaul network 200 may support the use of one or more node functions to enable efficient resource allocation for wireless backhaul communications. In such cases, the access nodes 105 may instantiate one or more node functions to coordinate signaling and resource allocation. That is, the access nodes 105 may instantiate one or more ANFs 205, one or more UEFs 210, or any combination thereof.

For example, access node 105-*a* may be located at a central point of a star, and may be coupled with a wireline backhaul link 230 (i.e., an optical fiber cable). In some cases, access node 105-*a* may be the only access node 105 in backhaul network 200 that is coupled with the wireline backhaul link 230. Access node 105-*a* may instantiate an ANF 205, and the access nodes 105 at the leaves of the star (access node 105-*b* and access node 105-*c*) may each instantiate a UEF 210. Access node 105-*a* may then communicate with access node 105-*b* and access node 105-*c* using communication link 225-*a* according to an active mode or a suspended mode using the node functions. In some cases, communication link 225-*a* may be associated with a first set of wireless resources.

The ANF 205 and the UEFs 210 may be assigned the same functionalities and signaling protocols for resource allocation as defined by a RAT. That is, resource coordination of a backhaul star can be managed via the RAT, such as a mmW RAT and managed via radio resource control (RRC) signaling, for example. Furthermore, wireless resource use among access nodes 105 within a star may be coordinated via a large-scale (e.g., network-wide) schedule. Within each star, signaling and resource management may be regulated by the RAT and a resource sub-schedule may be generated by a star's ANF 205 (such as the ANF 205 instantiated at access node 105-*a*).

In some examples, access node 105-*b* may instantiate an ANF 205 in addition to the UEF 210. Access node 105-*b* may accordingly communicate with access node 105-*c* using communication link 225-*b* according to an active or a suspended mode using the node functions. In some cases, communication link 225-*b* may be associated with a second set of wireless resources.

In another example, access node 105-*d* may instantiate an ANF 205 and communicate with a UEF 210 at access node 105-*a* over communication link 225-*c*. In some examples, communication link 225-*c* may be associated with the second set of resources. That is, communication link may use the same resources as communication link 225-*b*. Additionally, the ANF 205 at access node 105-*d* may be used for mobile access, where access node 105-*d* may communicate with one or more UEs 115 over communication link 225-*d*. As a result, access node 105-*d* may forward data between the one or more UEs 115 and access node 105-*a*. Accordingly, IAB may be accomplished by including the additional star with access node 105-*d* at the center and the UEs 115 at the leaves of the star.

In some cases, ANFs 205 may support transmission of a downlink control channel, reception of an uplink control channel, scheduling of downlink and uplink data transmission within a resource space assigned to a link or to a set of links, transmission of synchronization signals and cell reference signals (e.g., as a primary synchronization symbol (PSS) or secondary synchronization symbol (SSS) on a synchronization channel), transmitting beam sweeps, and transmitting downlink beam change requests. Additionally, UEFs 210 may support reception of a downlink control channel, transmission of a uplink control channel, requesting scheduling of uplink data transmissions, transmission of random access preambles on a random access channel, listening to beam sweeps and reporting beam indexes and beam signal strength detected, and executing downlink beam change requests. In some cases, there may be other features that differentiate the ANF and the UEF implemented at a node. As described above, an access node 105 node may implement a combination of one or more node functions, such as multiple ANFs 205, multiple UEFs 210, or combinations thereof.

Figure 3:
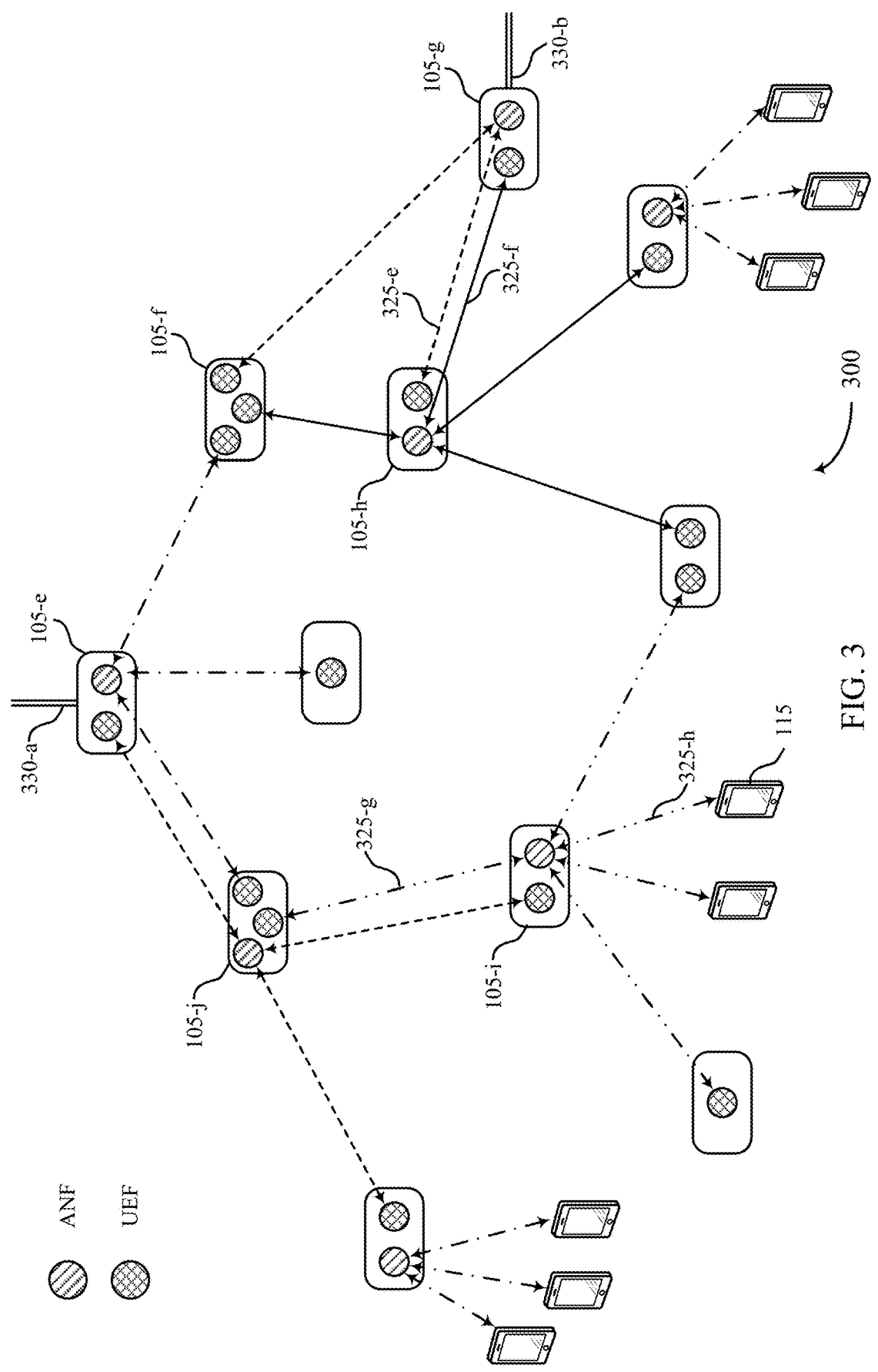
FIG. 3 illustrates an example of a communications network that supports dynamic resource allocation in a wireless network in accordance with aspects of the present disclosure.

FIG. 3 illustrates an example of a backhaul network 300 for dynamic resource allocation in a wireless network. In some cases, the backhaul network 300 may be an example of a wireless communications network that communicates using mmW frequency ranges. The backhaul network 300 may include a number of access nodes 105 that communicate over a number of different communication links 325, where the communication links 325 may be associated with a same or different set of wireless resources. The access nodes 105 may be examples of the access nodes 105 described in reference to FIGS. 1 and/or 2. The backhaul network 300 may be an example of a wireless communications system that supports multiple hops and topological redundancy for backhaul links using a RAT.

In some examples, complex backhaul topologies may be handled by composing the topology from multiple stars that mutually overlap. For instance, backhaul network 300 may comprise a mesh topology with two interfaces to a wireline network (e.g., access nodes 105-*e* and 105-*g* coupled with wireline backhaul links 330-*a* and 330-*b*). Such a topology may comprise multiple stars, where some stars mutually overlap. An ANF may be allocated to an access node 105 at the center of each star (e.g., access nodes 105-*c*, 105-*g*, 105-*h*, etc.,) and further includes a UEF at the access node 105 at each of the leaves. As a result, a backhaul node may include multiple ANFs and UEFs.

For example, access node 105-*f* may include multiple instances of a UEF, where it may communicate with the ANFs at access nodes 105-*e*, 105-*g*, and 105-*h*. Additionally, access nodes 105-*g* and 105-*h* may each communicate with each other using at least one ANF and at least one UEF, and may form overlapping stars. In such cases, access node 105-*g* and access node 105-*h* may communicate over communication links 325-*c* and 325-*f* that provide topological redundancy for the backhaul network 300. In some cases, communication links 325-*c* and 325-*f* may be associated with different sets of resources, where the resources are cooperatively allocated according to a schedule established by the ANFs. Multiple stars may use techniques to coordinate wireless resources, which may efficiently handle any system constraints (e.g., half-duplexed communications, inter-link interference, etc.). For instance, inter-link interference may be managed using spatial division multiple access (SDMA) techniques (e.g., through the use of narrow beams), and inter-node beam coordination may account for any remaining interference.

Additionally or alternatively, mobile access may be integrated into such a star topology through additional stars with UEs 115 at their leaves and an access node 105 at their center. In some examples, mobile access links may also be added to existing stars. In an example, access node 105-*i* may communicate with access node 105-*j* using communication link 325-*g*. Access node may further communicate with one or more UEs 115 over communication links 325-*h*. In this example, communication links 325-*g* and 325-*h* both share the same set of wireless resources to provide integrated access and backhaul. As can be seen in FIG. 3, a range of ANF and UEF combinations may be instantiated in an access node 105. Additional or different combinations of UEF and ANF instances in access nodes 105, as well as different topologies not shown in FIG. 3, may be possible.

To coordinate timing of transmission and reception, all links may be coordinated using time synchronization, where a frame structure supported by a cellular RAT may be used. For instance, time synchronization may be achieved through a determination of timing parameters associated with another wireless node, e.g., another wireless node may transmit an indication of synchronization signal transmission timing. In some examples, further coordination between wireless nodes may be used since different wireless nodes may implement multiple ANFs and/or UEFs.

In some examples, access node 105 may include multiple node function instances, which may further use a routing function that makes decisions on forwarding of data among node functions residing on the same node. The routing function may be executed or instantiated, for example, on any one of a number of protocol layers (e.g., the routing function may be executed on an Internet Protocol (IP) layer). In some cases, the access node 105 may access a routing table, and may forward data between node functions based on the routing table. Additionally or alternatively, a routing function or a routing table may be used to forward data between different access nodes 105.

In some examples, a large-scale or network-wide scheduling (e.g., a super schedule) which may include a time division multiplexed (TDM) schedule, a frequency division multiplexed (FDM) schedule, a code division multiplexed (CDM) schedule, a spatial division multiplexed (SDM) schedule, or any combinations thereof, may be used to assign resources to the various access nodes 105 within in a coordinated manner. For example, adjacent stars (e.g., different stars with leaves that share at least one node) or overlapping stars (e.g., stars with one common leaves) may use different wireless resources. At the same time, disjoint stars (e.g., stars that are neither adjacent nor overlapping) may reuse the same wireless resources. The schedule may be followed by all participating wireless nodes through a mutual time synchronization and the frame structure, which may be defined by the RAT.

Figure 4:
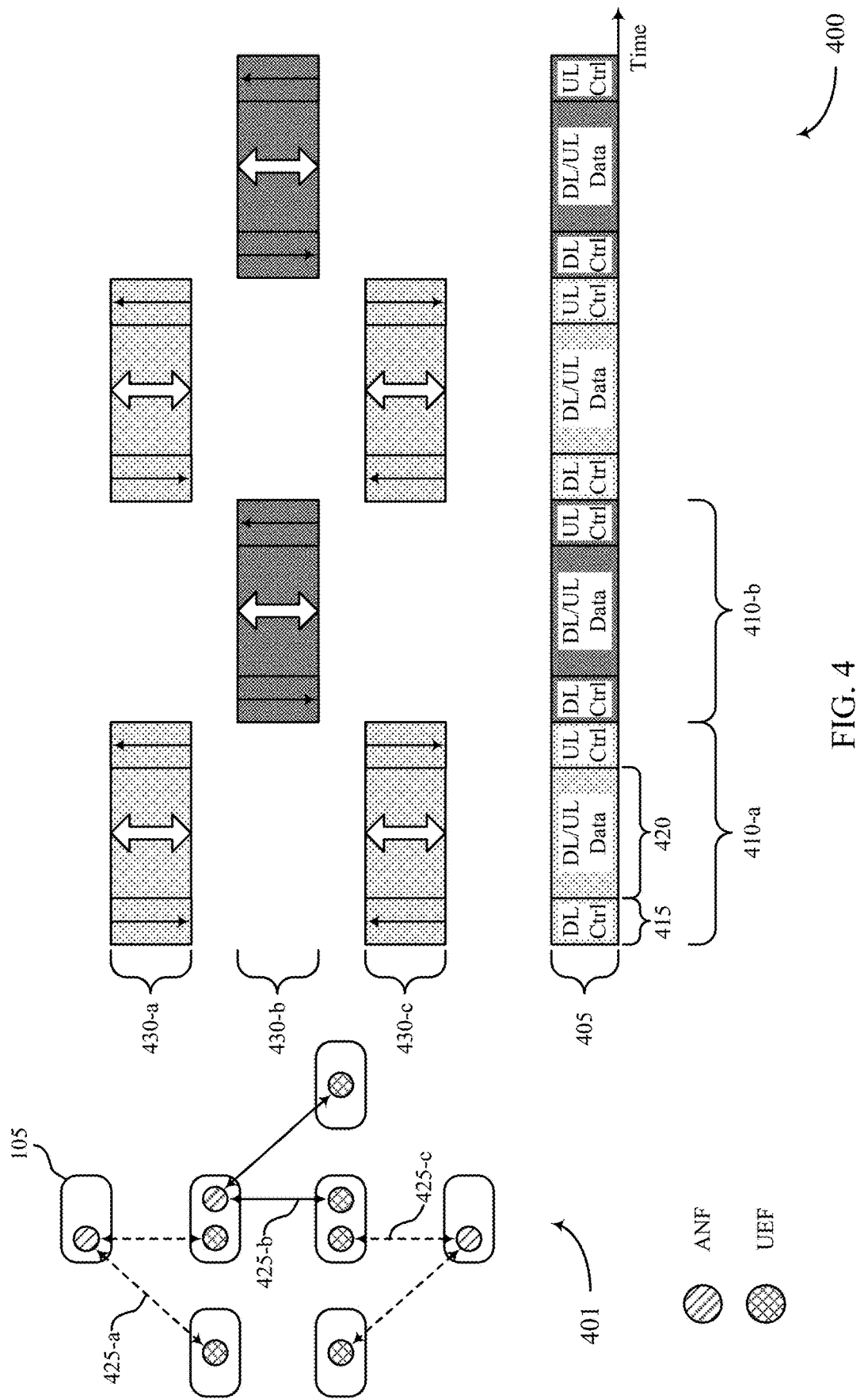
FIG. 4 illustrates an example of a schedule that supports dynamic resource allocation in a wireless network in accordance with aspects of the present disclosure.

FIG. 4 illustrates an example of a schedule 400 for dynamic resource allocation in a wireless network. Schedule 400 may illustrate an example of time-multiplexing wireless resources for multiple access nodes that form a mesh topology. For example, schedule 400 may illustrate a schedule used by a backhaul network 401 that comprises seven access nodes 105 that form three different stars. In some examples, the backhaul network 401 includes both wireless and wired communication links.

Schedule 400 may be aligned to a synchronized and slotted frame structure for uplink and downlink transmissions. For example, a frame structure 405 may be supported by a RAT (e.g., a mmW RAT) and be used to coordinate signaling and resource allocation in a wireless backhaul network, such as backhaul network 200 or backhaul network 300 as described with reference to FIGS. 2 and 3, or backhaul network 401. Within frame structure 405, a frame may occupy a time slot 410, and each frame may include control portions 415 (e.g., a portion that includes downlink control and a portion that includes uplink control at the beginning and end of the frame, respectively) and a data portion 420 (e.g., a portion that is used for the transmission of uplink and downlink data). For instance, each time slot 410 may include a downlink control channel in a first sub-slot, a downlink or uplink data channel in a second sub-slot, and an uplink control channel in a third sub-slot. In some examples, a time slot 410 may represent a frame or a subframe. In the example of the schedule 400, downlink data and control may be transmitted between an ANF and a UEF, and uplink data and control may be transmitted between a UEF and an ANF.

In some examples, the schedule 400 may be based on a network topology (e.g., the topology of the backhaul network 401), where the schedule 400 divides resources into multiple groups (e.g., respective groups for ANF and UEFs). The schedule 400 may assign alternating time slots 410 to these resources, where a first time slot 410-*a* is associated with a first set of wireless resources and a second time slot 410-*b* is associated with a second set of wireless resources.

An access node 105 within backhaul network 401 may communicate with one or more other access node 105 using one or more node functions, such as an ANF and a UEF, as described with reference to FIGS. 2 and 3. Accordingly, communication may take place between a first access node 105 using an ANF and one or more access nodes 105 using a UEF over communication links 225-*a*. Similarly, a second access node 105 and a third access node 105 using an ANF may respectively communicate with one or more other access nodes 105 over communication links 425-*b* and 425-*c*. In some examples, the communication links 425 may be associated with respective sets of resources. That is, communication links 425-*a* and communication links 425-*c* may use the first set of wireless resources and communication link 425-*b* may use the second set of wireless resources. The access nodes 105 may be examples of the access nodes 105 described in reference to FIGS. 1, 2 and/or 3.

A node function may operate according to an active mode and a suspended mode based on schedule 400. That is, a node function may be active or suspended in respective time slots 410 according to a resource schedule 430. As an example, access nodes 105 using communication links 425-*a* and 425-*c* (and using the same set of resources) may communicate using resource schedule 430-*a* and resource schedule 430-*c,* respectively. In such cases, the access nodes 105 may communicate using control portions 415 and data portions 420 in the first time slot 410-*a* during an ANF active mode, and may refrain from transmitting during the second time slot 410-*b* during an ANF suspended mode. Further, an ANF at an access node 105 using communication links 425-*b* may refrain from communicating during the first time slot 410-*a,* but communicate according to resource schedule 430-*b* during an ANF active mode in second time slot 410-*b*. While FIG. 4 illustrates time resources, such techniques may also be used for be frequency resources, code resources, spatial resources (e.g., directional transmission beams), or any combination thereof.

In some cases, an ANF may use every resource schedule 430 for designated time slots 410 for communication between the UEFs that the ANF controls. In some cases, within each resource allocation established by the schedule 400, each ANF may schedule resources among one or more UEFs, and an access node 105 may further sub-schedule resources among multiple UEs 115 (not shown). In some examples, other resource allocation schemes for the schedule may be possible. That is, more time slots 410 may be allocated to a wireless resource than for another wireless resource. Additionally or alternatively, a greater number of resources may be scheduled based on a network topology.

Figure 5:
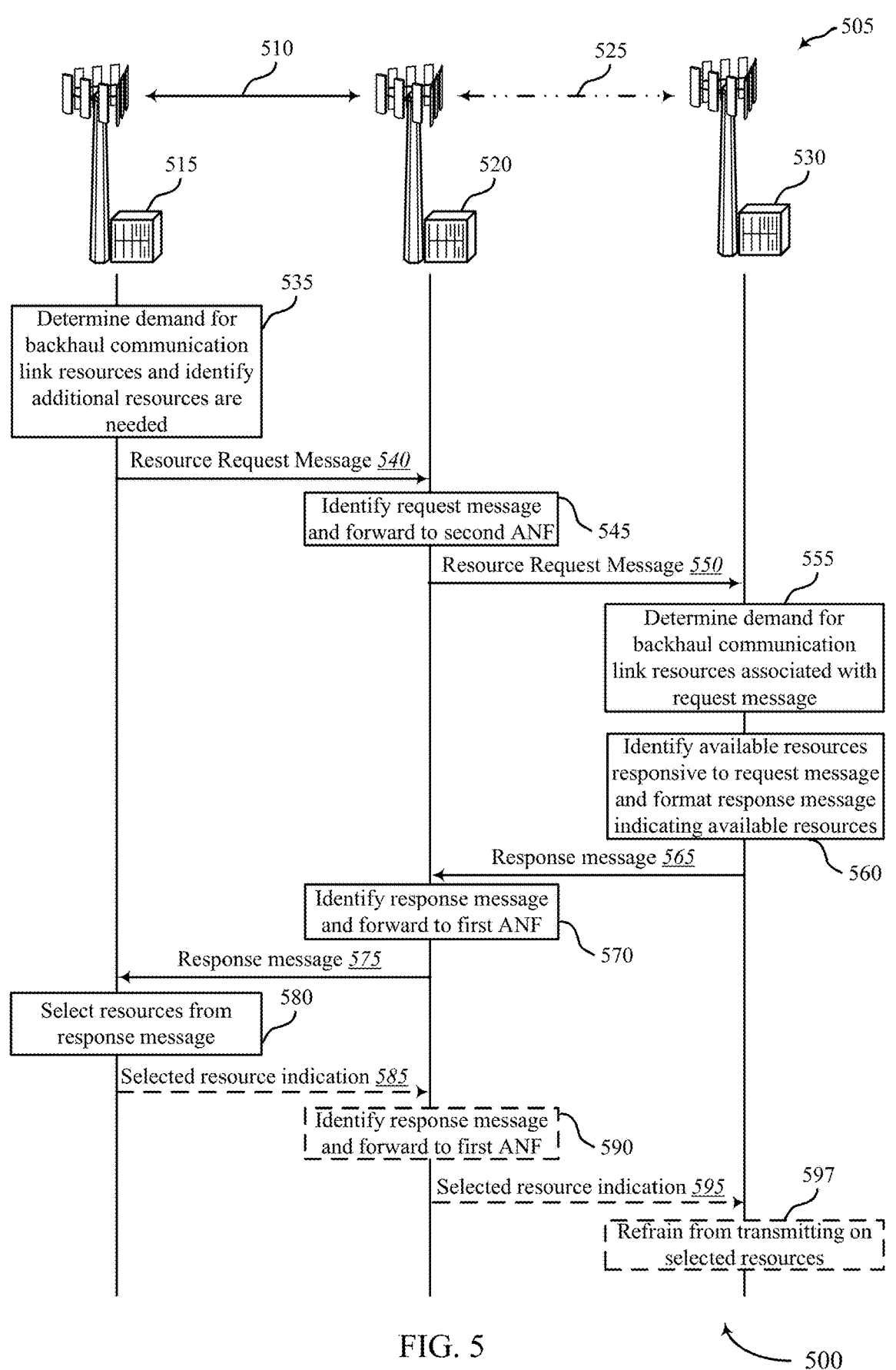
FIG. 5 illustrates an example of a communication swim diagram that supports dynamic resource allocation in a wireless network in accordance with aspects of the present disclosure.

FIG. 5 illustrates an example of a communication swim diagram 500 for dynamic resource allocation in a wireless network. The diagram 500 shows communications for a communications network 505. In some examples, the communications network 505 may be a wireless backhaul network. The communications network 505 includes a first communication link 510 established between a first access node 515 and a second access node 520 and a second communication link 525 established between the second access node 520 and a third access node 530. In some examples, the access nodes 515, 520, 530 may embodied as access nodes 105 or base stations for a 5G or LTE access network.

Resources of the communications network 505 may be allocated to the first communication link 510 and the second communication link 525, and other communications links in the communications network 505, according to a schedule, such as schedule 400 of FIG. 4. In some examples, the schedule 400 may be the synchronized frame structure 800 or the synchronized frame structure 900 described with reference to FIGS. 8 and 9. The resources defined by the schedule 400 may be time slots, time intervals, frequency bands, codes, antenna beams, antenna ports, or any combination thereof. In the illustrative example, the schedule 400 assigns time intervals (or other resources) to each communication link such that a first subset of resources are dedicated to the first access node 515 and a second subset of resources are dedicated to the third access node 530.

The first access node 515 may implement a first ANF for the first communication link 510 that allows the first access node 515 to schedule transmissions on the first communication link 510 with a UEF implemented at the second access node 520. The access node 520 may implement the first UEF for the first communication link 510 that allows the access node 520 to communicate via the first communication link 510. Similarly, the third access node 530 may implement a second ANF for the second communication link 525 and the second access node 520 may implement a second UEF for the second communication link 525.

The swim diagram 500 illustrates an example of resource request/availability signaling between access nodes 515, 520, 530. The resource request/availability signaling may be used to dynamically indicate needs for additional resources and dynamically reallocate local resources between the access nodes. The swim diagram 500 is presented for illustrative purposes of the basic principles of resource request/availability signaling.

At block 535, the first ANF at the first access node 515 may determine a demand for backhaul communication link resources and identify that additional resources are needed at the first ANF. In some cases, the first ANF may predict a pending need for particular resources, such as time slots defined by the schedule 400 that are dedicated to the first communication link 510. The determination of demand may include link quality measurements to gauge the channel conditions and the corresponding transmission rate. The determination of demand may also be based on queuing load, for instance. The first ANF may evaluate these properties on one single link or on multiple links (e.g. if the ANF multiplexes its resource over these multiple links). This evaluation may include measurements of DL link quality and load and UL link quality and load. The UL load may, for instance, be signaled to the ANF via UL transmission requests (e.g., scheduling requests). In some examples, the access node 515 may use machine learning, past historical data, or other more global data to estimate demand for resources on the first communication link 510. The first ANF may generate a resource request message 540 and transmit the resource request message 540 to the first UEF at the second access node 520. In some cases, the request message

540 may include information regarding particular resources that the first ANF is requesting.

At block 545, the first UEF at the second access node 520 receive the resource request message 540, identify the message as a resource request message, and forward resource request message 550 to the second ANF at the third access node 530. In some cases, the first UEF may forward the resource request message 540 to a collocated second UEF that is configured at the second access node 520.

At block 555, the second ANF at the third access node 530 may determine demand for backhaul communication link resources associated with the request message. The second ANF may make such a determination in a similar manner as the first ANF does at block 535, for example. Based on the determination of available resources, the second ANF, at block 560, may identify available resources that are responsive to the request message and format a response message that indicates available resources of the second ANF that the first ANF may use.

The second ANF may transmit response message 565 to the second access node 520 using second communication link 525. In some cases, a second UEF associated with the second ANF may receive the response message 565, and identify the response message to be forwarded to the first ANF, as indicated at block 570. The second UEF may transmit (e.g., via a collocated first UEF associated with the first ANF) response message 575 to the first ANF at the first access node 515.

The first ANF, at block 580, may receive the response message, and select a resource from the response message. The first ANF may use the selected resource for backhaul communications. In some cases, the first ANF may optionally transmit an indication of the selected resources 585 back to the second ANF. In such cases, the first UEF at the second access node 520 may, at block 590, identify the response message and forward the selected resource indication 595 to the second ANF. The second ANF, at block 597, may receive the indication of the selected resources and refrain from transmitting using the selected resources. In some cases, the selected resources may be a subset of the available resources that the second ANF initially indicated, and the second ANF may use resources that were not selected by the first ANF, may provide such resources to another ANF for potential use, or combinations thereof.

While the swim diagram 500 shows communications across the communication links 510, 525 and three access nodes 515, 520, 530, the methods described herein may be expanded to include additional communication links and additional access nodes.

The access nodes 515, 520, 530 may be examples of access nodes 105 described with reference to FIGS. 1-4. The ANFs may be examples of the ANFs described with reference to FIGS. 2-4. The UEFs may be examples of the UEFs described with reference to FIGS. 2-4. The communication links 510, 525 may be examples of the communication links described with reference to FIGS. 2-4. In some cases, the second ANF may be collocated with the first UEF at the second access node 520.

Figure 6A:
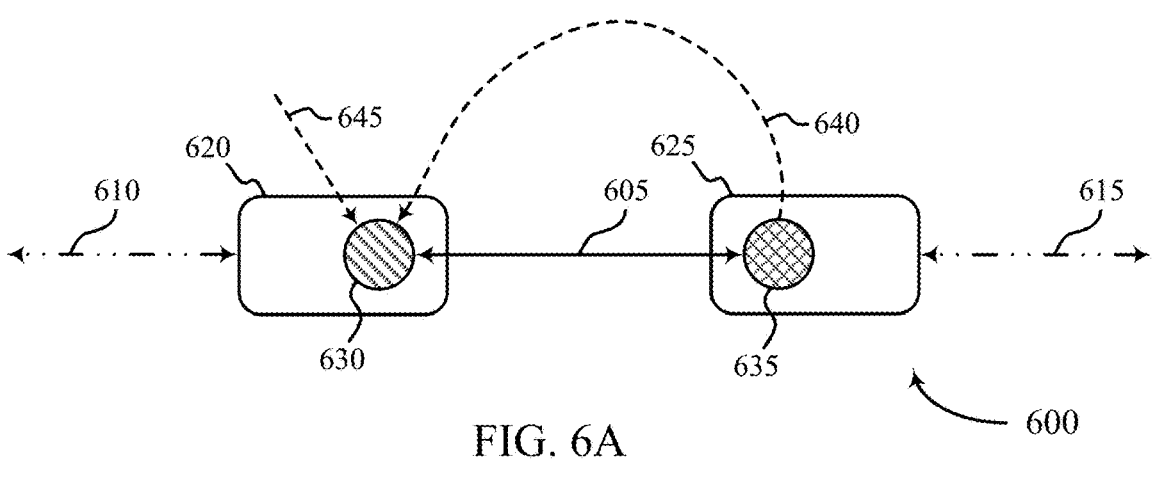
FIGS. 6A-6C illustrate examples of network connection diagrams that support dynamic resource allocation in a wireless network in accordance with aspects of the present disclosure.
Figure 6B:
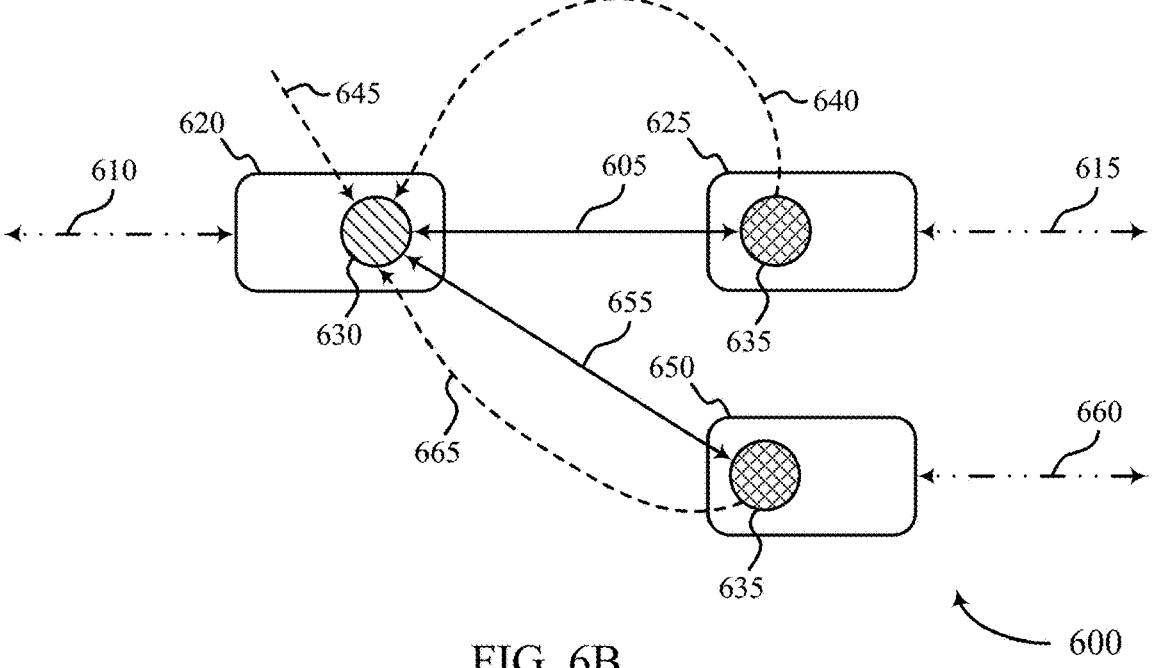
Figure 6C:
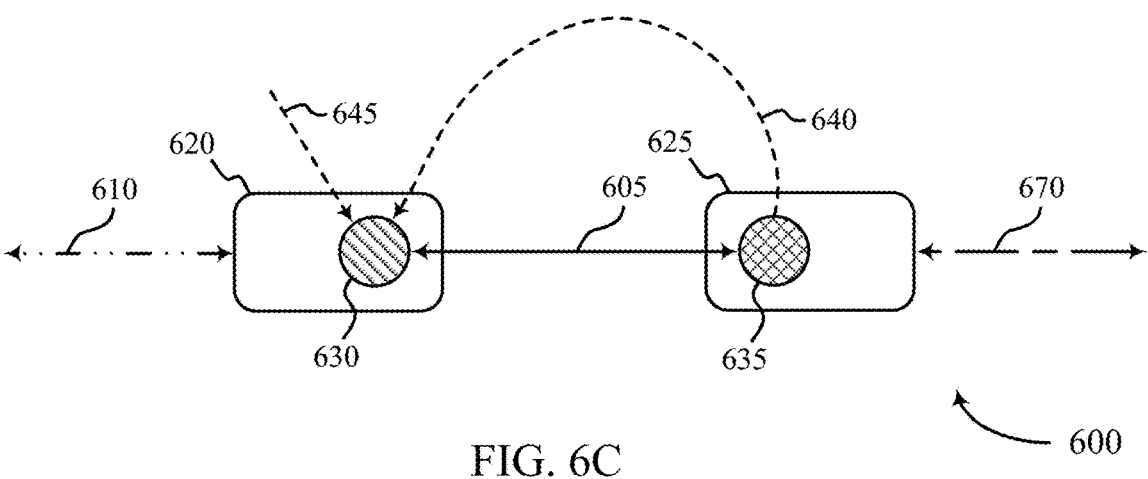

FIGS. 6A-6C illustrate examples of network connection diagrams of a communications network 600 for dynamic resource allocation in a wireless network. FIGS. 6A-6C illustrate examples of resource request/availability signaling as it occurs in different network topologies.

FIG. 6A shows a local network topology for a communications network 600. The communications network 600 may be a wireless backhaul network. The communications network 600 includes a primary communication link 605, a first auxiliary communication link 610, and a second auxiliary communication link 615. The communication links 605, 610, 615 may be similar to the other communication links discussed above (e.g., communication links 510, 525). The primary communication link 605 may be assigned a first subset of resources by the schedule 400. The auxiliary communication links 610, 615 may be assigned a second subset of resources by the schedule 400. The auxiliary communication links 610, 615 may utilize the same subset of resources because they may be separated enough spatially that they will not interfere with one another.

An access node 620 may communicate with an access node 625 via the primary communication link 605. In addition, the access node 620 may communicate with other access nodes via the first auxiliary communication link 610 and the access node 625 may communicate with other access nodes via the second auxiliary communication link 615. In the illustrative example, the access node 620 implements an ANF 630 for the primary communication link 605 and the access node 625 implements a UEF 635 for the primary communication link 605. In other examples, however, the functions of the access nodes 620, 625 may be reversed. As used in this disclosure, the terms primary and auxiliary are not meant to denote differences in technical features, importance, or priority but to denote that different resources are dedicated for each link by the resource plan (e.g., schedule 400).

The ANF 630 of the primary communication link 605 (e.g., access node 620) may receive a first indication message 640 regarding the occupancy/availability of resources on the first auxiliary communication link 610 and a second indication message 645 regarding the occupancy/availability of resources on the second auxiliary communication link 615. Due to high resource demand, the ANF 630 may wish to also use resources from its adjacent links (e.g., links 610, 615), and may transmit a request message for additional resources, and the indication messages 640, 645 may be transmitted in response to the request message. If both of the indication messages 640, 645 indicate that both the resources of both neighboring communication links (e.g., links 610, 615) are available during a particular time interval, the ANF 630 may then utilize the available resource of the auxiliary communication links for its own traffic. In some cases, the ANF 630 may select some or all of the available resources and transmit an indication of the selected resources.

FIG. 6B shows a similar local network topology for the communications network 600 as shown in FIG. 6A, except an additional access node 650 is added to the communications network 600. The access node 650 is coupled to the access node 620 via a second primary communication link 655. The second primary communication link 655 utilizes the same subset of resources defined by the schedule 400 as the first primary communication link 605. The access node 650 may be coupled to other access nodes via a third auxiliary communication link 660, which uses the same subset of resources defined by the schedule 400 as the other auxiliary communication links 610, 615. The access node 650 may implement a UEF 635 for the second primary communication link 655. The access node 650 may transmit a third indication message 665 regarding the occupancy/availability of resources for the third auxiliary communication link 660 to the ANF 630, responsive to a resource request message.

FIG. 6C shows a similar local network topology for the communications network 600 as shown in FIG. 6A, except that the access node 625 is coupled to other access nodes via a tertiary communication link 670 instead of the second auxiliary communication link 615. The tertiary communication link 670 may utilize a third subset of resources defined by the schedule 400 different from the first subset and the second subset of resources utilized by the primary communication links 605, 655 and the auxiliary communication links 610, 615, 660 respectively.

The ANF 630 may utilize the resources of the auxiliary communication link 610 or the tertiary communication link 670 based at least in part on their respective occupancy/availability, which may be provided in response to a resource request message. For example, if the first indication message 640 indicates that resources dedicated to the auxiliary communication link 610 are available, the ANF 630 may decide to transmit data across the primary communication link 605 using those resources. In another example, if the second indication message 645 indicates that resources dedicated to the tertiary communication link 670 are available, the ANF 630 may decide to transmit data across the primary communication link 605 using those resources.

It should be appreciated that different network topologies may include any combination of the topologies discussed above. For example, a network topology may include four different communication links using four different subsets of resources. In other examples, each communication link may have any number of connections that an ANF may check before utilizing resources not dedicated to a particular communication link.

The access nodes 620, 625, 650 may be examples of access nodes 105 described with reference to FIGS. 1-5. The ANF 630 may be examples of the ANFs described with reference to FIGS. 2-5. The UEF 635 may be examples of the UEFs described with reference to FIGS. 2-5. The communication links 605, 610, 615, 660, 670 may be examples of the communication links described with reference to FIGS. 2-5.

Figure 7A:
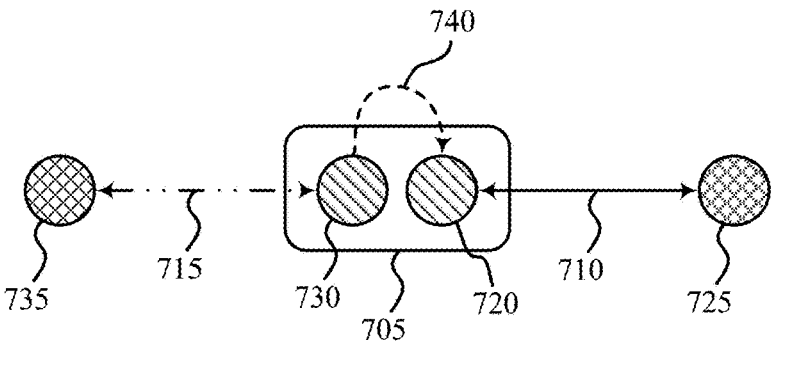
FIGS. 7A-7C illustrate examples of indication message transmission diagrams that support dynamic resource allocation in a wireless network in accordance with aspects of the present disclosure.
Figure 7B:
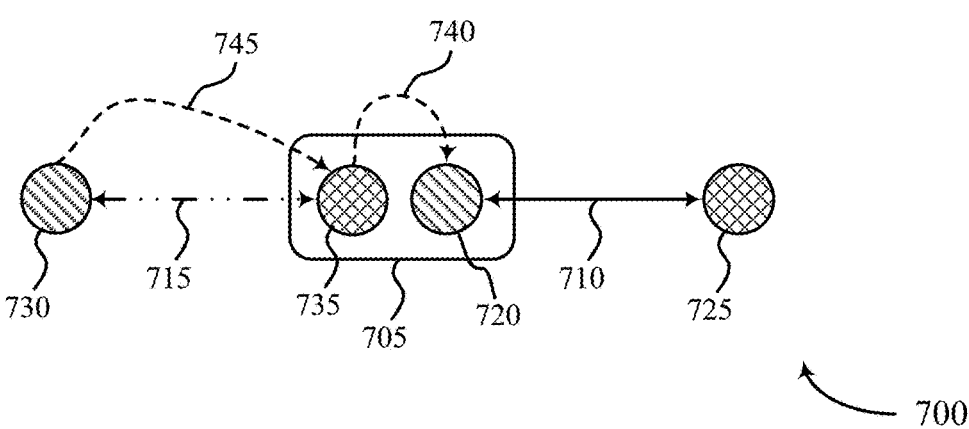
Figure 7C:
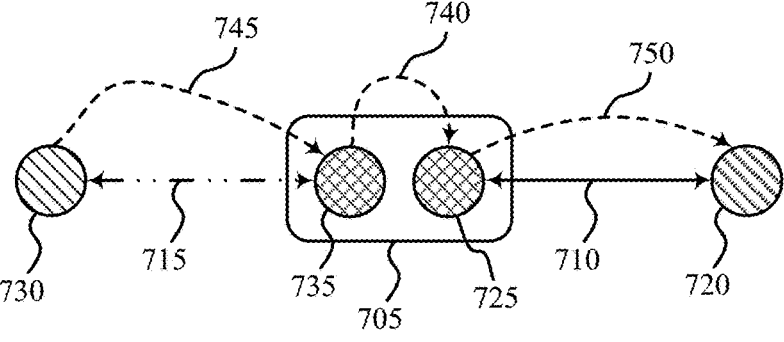

FIGS. 7A-7C illustrate examples of indication message transmission diagrams for dynamic resource allocation in a wireless network 700. Depending on the network topology of the wireless network 700, indication messages may be forwarded, transmitted, and/or replied in different ways. FIGS. 7A-7C are intended to demonstrate basic principles of indication message travel and communication. Various network topologies may deviate from these principles or may use any combination of these principles.

FIG. 7A illustrates a network topology that includes an access node 705 coupled with other access nodes via a first communication link 710 and a second communication link 715. The communication links 710, 715 utilize different subsets of resources defined by the schedule 400. In the illustrative example of FIG. 7A, the access node 705 implements an ANF 720 for the first communication link 710 and implements an ANF 730 for a second communication link 715. The ANFs communicate with associated UEFs 725, 735. The UEFs 725, 735 may be implemented by other access nodes that are not depicted here.

The ANF 730 may determine that additional resources are needed, and may send a request message 740 to the ANF 720. It may be determined that resources dedicated to the first communication link 710 are available to be used by other communication links. For example, the ANF 720 of the first communication link 710 may determine that certain resources of the first communication link 710 may be available for a certain time interval (or other type of wireless resource). Because both the ANF 720 of the first communication link 710 and the ANF 730 of the second communication link 715 are implemented on the access node 705, the ANF 730 may send a request message 740 directly to the ANF 720 internal to the access node 705. In such a situation, no signaling across the wireless network may be performed. Likewise, a response message indicating available resources may be sent from the ANF 720 to the ANF 730.

FIG. 7B illustrates a similar network topology to that shown in FIG. 7A except that the access node 705 implements the UEF 735 of the second communication link 715 instead of the ANF 730 of the second communication link 715. Thus, UEF 735 and ANF 720 are collocated at the access node 705. In order for ANF 730 to request resources, two request messages may be used. The ANF 730 may generate and transmit a request message 745 to its related UEF 735 being implemented by neighboring access nodes (e.g., access node 705). Once the UEF 735 receives the request message 745, the UEF 735 may generate the intra-access node request message 740 and send it to the ANF 720 for the first communication link 710. In this manner, request messages may be received by ANFs of the relevant communication links.

FIG. 7C illustrates a similar network topology to that shown in FIG. 7B except that the access node 705 implements the UEF 725 of the first communication link 710 instead of the ANF 720 of the first communication link 710. In order for ANF 730 to request resources, three indication messages may be used. The ANF 730 may generate and transmit a request message 745 to its related UEF 735. UEF 735 may send the request message to UEF 725 by generating an intra-access node request message 740. The UEF 725 may then generate another request message 750 to transmit via the first communication link 710 to the ANF 720. A response message may be transmitted back to the ANF 730 in a similar manner.

The access node 705 may be an example of access nodes 105 described with reference to FIGS. 1-6. The ANFs 720, 730 may be examples of the ANFs described with reference to FIGS. 2-6. The UEFs 725, 735 may be examples of the UEFs described with reference to FIGS. 2-6. The communication links 710, 715 may be examples of the communication links described with reference to FIGS. 2-6.

Figure 8:
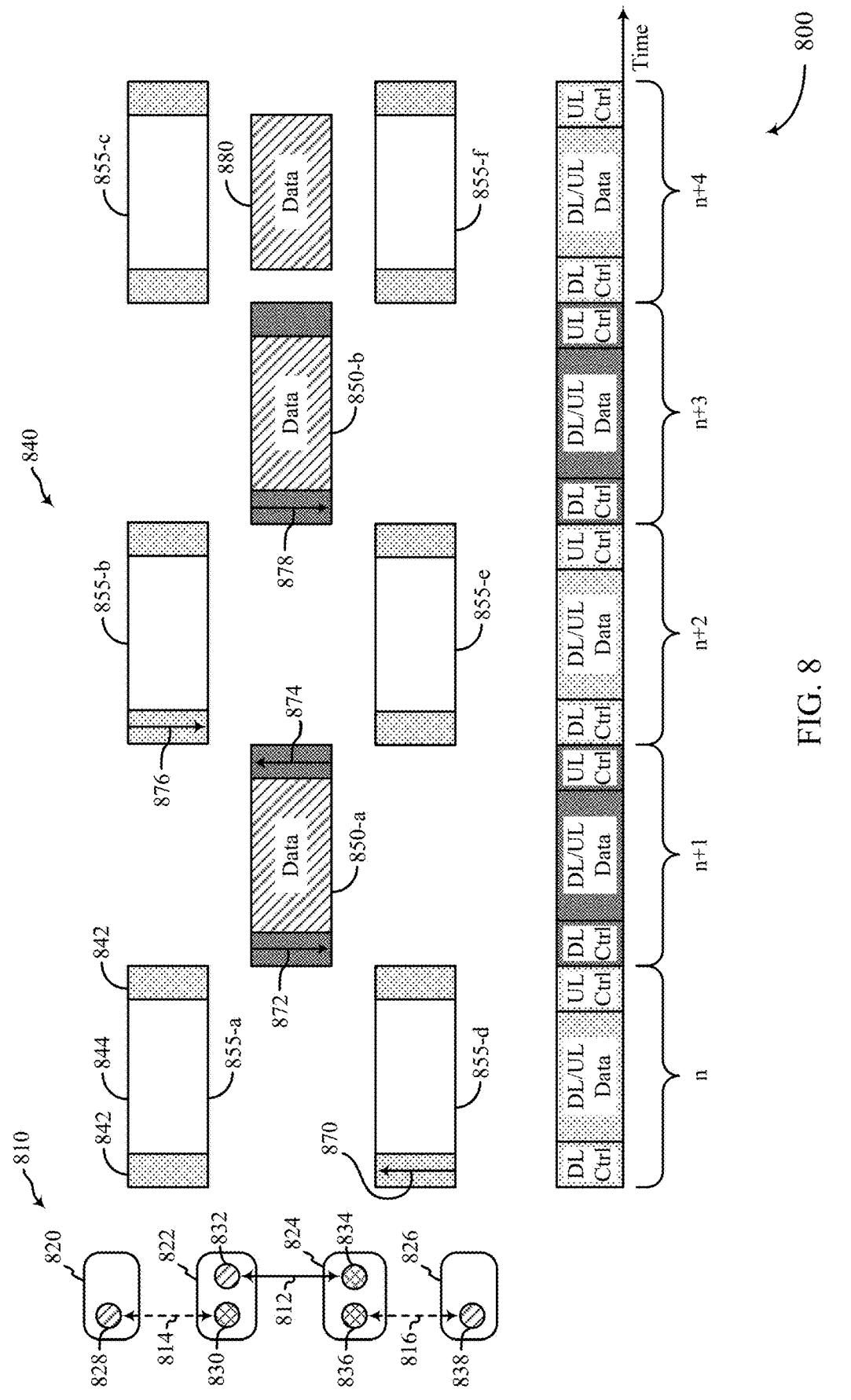
FIG. 8 illustrates an example of resource allocation in a synchronized frame structure that supports dynamic resource allocation in a wireless network in accordance with aspects of the present disclosure.

FIG. 8 illustrates an example of a resource allocation in a synchronized frame structure 800 for dynamic resource allocation in a wireless network. The resource allocation scheme shown FIG. 8 illustrates how resources can be shifted among nodes within a synchronized frame structure 800. A communications network 810 may include a chain of three communication links. The communications network 810 may be a wireless backhaul network. The synchronized frame structure 800 may be an example of the schedule 400.

The communications network 810 includes a primary communication link 812, a first auxiliary communication link 814, and a second auxiliary communication link 816. The communications network 810 includes four access nodes, a first access node 820, a second access node 822, a third access node 824, and a fourth access node 826. The first access node 820 may implement an ANF 828 for the first auxiliary communication link 814. The second access node 822 may implement a UEF 830 for the first auxiliary communication link 814 and an ANF 832 for the primary communication link 812. The third access node 824 may implement a UEF 834 for the primary communication link 812 and a UEF 836 for the second auxiliary communication link 816. The fourth access node 826 may implement an ANF 838 for the second auxiliary communication link 816.

The access nodes 820, 822, 824, 826 may be examples of access nodes 105 described with reference to FIGS. 1-7. The ANFs 828, 832, 838 may be examples of the ANFs described with reference to FIGS. 2-7. The UEFs 830, 834, 836 may be examples of the UEFs described with reference to FIGS. 2-7. The communication links 812, 814, 816 may be examples of the communication links described with reference to FIGS. 2-7.

The synchronized frame structure 800 may include a number of resources 840 that include a control portion 842 and a data portion 844. In some examples, a resource 840 includes two control portions 842, a downlink control portion (or a DL control channel) and an uplink control portion (or a UL control channel). In the illustrative example, the resources 840 are embodied as frames spanning a unique time interval. A first subset 850 of resources 840 are dedicated for the primary communication link 812. A second subset 855 of resources 840 are dedicated for the auxiliary communication links 814, 816. For example, the first subset 850 includes resources at time intervals n+1, n+3, etc., and the second subset 855 includes resources at time intervals n, n+2, n+4, etc. In other examples, the synchronized frame structure 800 may be divided into additional subsets of resources 840 depending on the network topology.

The following disclosure relate to how either indication messages may move between access nodes through the communications network 810 over time. Initially, at slot n−3, the ANF 832 may send a request to associated UEF 836 during a control part of the associated slot. The ANF 832 may also internally send the request to its collocated UEF 830. At time slot n−2 the UEFs 830, 836 may forward the requests to their respective ANFs 828, 838 during the control part of the time slot. At slot n, the ANF 838 may transmit an indication message 870 on a control portion 842 of a resource 855-*d*, which is received by the UEF 836 and passed on to the UEF 834. The indication message 870 may include information indicating that the resource 855-*f* (at time interval n+4) is available for ANF 832. In some examples, the information states that the second auxiliary communication link 816 may be available in four time slots.

At time slot n+1, the ANF 832 may transmit a scheduling message 872 during a control portion 842 to schedule data for transmission via the primary communication link 814 during this time slot. Also during the time slot n+1, the UEF 834 may send an indication message 874 to its ANF 832 on the UL control portion of resource 850-*a*. The indication message may include information that resource 855-*f* for the second auxiliary communication link 816 is available.

At time slot n+2, the ANF 828 of the first auxiliary communication link 814 may transmit an indication message 876 on the DL control portion 842 of resource 855-*b* of the first auxiliary communication link 814. The indication message 876 may include information that resource 855-*c* for the first auxiliary communication link 814 is available. The indication message may be received by the UEF 830 for the first auxiliary communication link 814 and passed on to the ANF 832 for the primary communication link 812.

At time slot n+3, the ANF 832 of the primary communication link 812 may transmit a scheduling message 878 to schedule data to be transmitted using resource 850-*b* via the primary communication link 812. In addition, the scheduling message 878 may also schedule data to be transmitted during the time slot n+4 because both resource 855-*c* and resource 855-*f* are not being used by their respective auxiliary communication links 814, 816. The scheduling message may be transmitted during a control portion of the resource 850-*b*.

At time slot n+4, a data message 880 may be transmitted via the primary communication link 812 using resources usually dedicated to the auxiliary communication links 814,

816. The data message 880 may be transmitted during the data portion of resources 855-c, 855-f, thereby allowing the auxiliary communication links 814, 816 to be used to transmit network messages, such as indication messages for indicating resources that may be available in the future. In some examples, the data message 880 is transmitted exclusively during the data portion.

Figure 9:
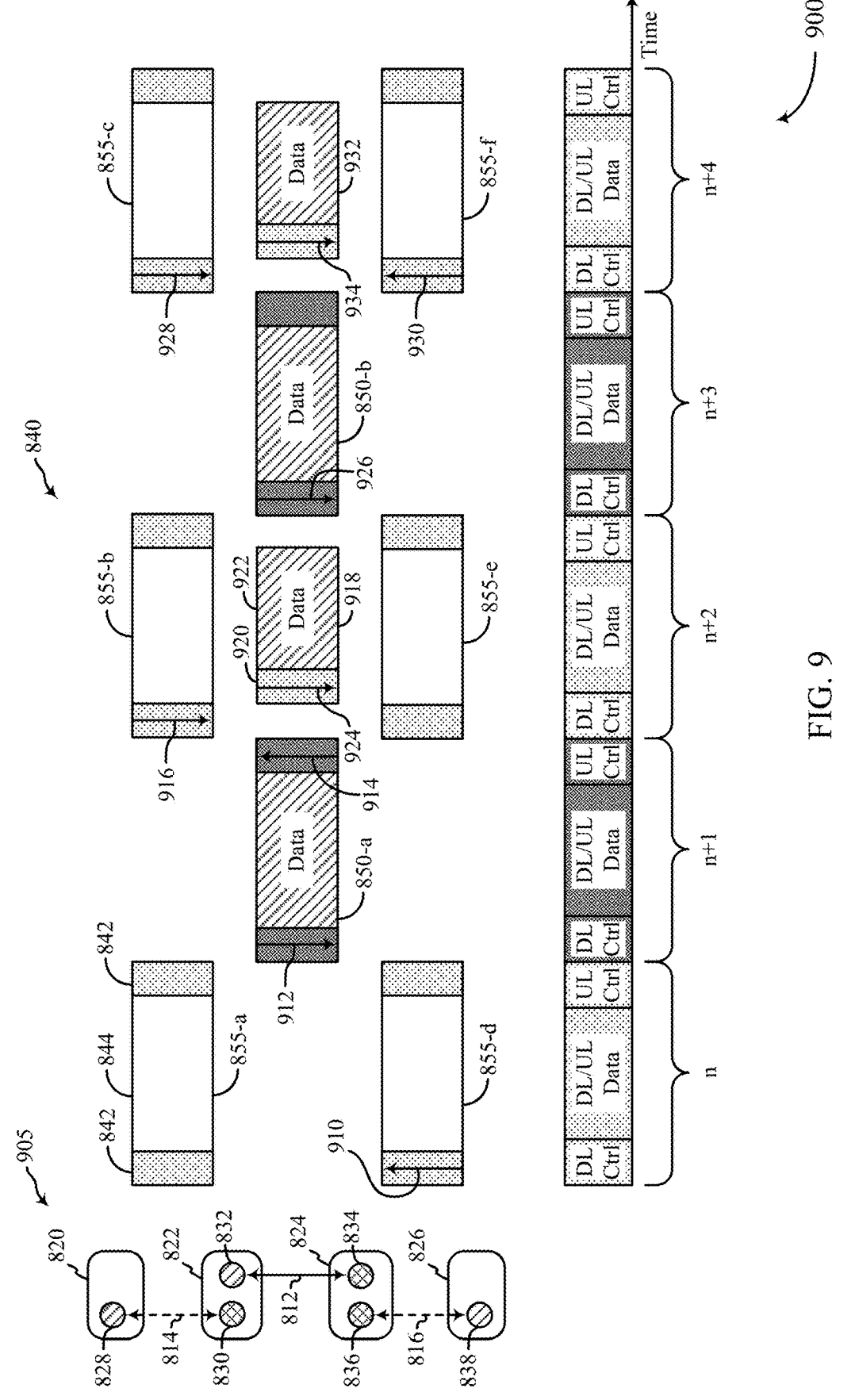
FIG. 9 illustrates another example of resource allocation in a synchronized frame structure that supports dynamic resource allocation in a wireless network in accordance with aspects of the present disclosure.

FIG. 9 illustrates an example of a resource allocation in a synchronized frame structure 900 for dynamic resource allocation in a wireless network. Another example of a resource allocation scheme is shown in FIG. 9. The features of the wireless network 905 and the synchronized frame structure 900 are similarly embodied as those described in FIG. 8 and thus descriptions of those features are not repeated here. It should be appreciated that features having similar or identical numbers may be embodied similarly. The synchronized frame structure 900 may be an example of the schedule 400. In the synchronized frame structure 900, a data message 918 transmitted using resources not dedicated to the relevant communication link may include a control portion 920 and a data portion 922 and a scheduling message 924 may be transmitted during the control portion 920.

Similarly as discussed above, ANF 832 may initially transmit a resource request for additional resources. For example, at slot n−3, the ANF 832 may send a request to associated UEF 836 during a control part of the associated slot. The ANF 832 may also internally send the request to its collocated UEF 830. At time slot n−2 the UEFs 830, 834 may forward the requests to their respective ANFs 828, 838 (via UEF 836) during the control part of the time slot. At slot n, the ANF 838 of the second auxiliary communication link 816 may transmit an indication message 910 on a control portion 842 of a resource 855-d, which is received by the UEF 836 of the second auxiliary communication link 816 and passed on to the UEF 834 of the primary communication link 812. The indication message 910 may include information indicating that the resource 855-e (at time interval n+2) is available for the second auxiliary communication link 816. In some examples, the information states that the second auxiliary communication link 816 may be available in two time slots.

At time slot n+1, the ANF 832 of the primary communication link 812 may transmit a scheduling message 912 during a control portion 842 of resource 850-a to schedule data for transmission via the primary communication link 812 during this time slot. Also during the time slot n+1, the UEF 834 of the primary communication link 812 may send an indication message 914 to its ANF 832 on the UL control portion of resource 850-a. The indication message 914 may include information that resource 855-f for the second auxiliary communication link 816 is available.

At time slot n+2, the ANF 828 of the first auxiliary communication link 814 may transmit an indication message 916 on the DL control portion 842 of resource 855-b of the first auxiliary communication link 814. The indication message 916 may include information that resource 855-b for the first auxiliary communication link 814 is available at the next time slot. The indication message 916 may be received by the UEF 830 for the first auxiliary communication link 814 and passed on to the ANF 832 for the primary communication link 812.

Upon receiving indication messages 910, 916, the ANF 832 for the primary communication link 812 may determine that it may utilize the resources normally dedicated to the auxiliary communication links 814, 816. As such, the ANF 832 may generate a data message 918 to be sent via the primary communication link 812 during the time slot n+2.

The data message 918 may include both a control portion 920 and a data portion 922. The data message 918 is also configured to be transmitted during the data portion 844 of resources 855-b, 855-e, thereby reserving the control portions 842 of those resources to be used by the auxiliary communication links 814, 816. A scheduling message 924 may be transmitted during the control portion 920 of the data message 918. The scheduling message 924 may be embodied similarly to other scheduling messages (e.g., scheduling message 912) and may schedule data for transmission via the primary communication link during the time slot n+2.

Time slots n+3 and n+4 illustrate another scenario that may occur using the data message 918. At time slot n+3, the ANF 832 of the primary communication link 812 may transmit a scheduling message 926 to schedule data to be transmitted using resource 850-b via the primary communication link 812.

At time slot n+4, the ANF 828 of the first auxiliary communication link 814 may transmit an indication message 928 on the DL control portion 842 of resource 855-c of the first auxiliary communication link 814. The indication message 928 may include information that resource 855-c for the first auxiliary communication link 814 is available at the next time slot. The indication message 928 may be received by the UEF 830 for the first auxiliary communication link 814 and passed on to the ANF 832 for the primary communication link 812. In addition, at time slot n+4, the ANF 838 of the second auxiliary communication link 816 may transmit an indication message 930 on a control portion 842 of a resource 855-f, which is received by the UEF 836 of the second auxiliary communication link 816 and passed on to the UEF 834 of the primary communication link 812. The indication message 928 may include information indicating that the resource 855-f is available for the second auxiliary communication link 816.

Upon receiving indication messages 928, 930, the ANF 832 for the primary communication link 812 may determine that it may utilize the resources normally dedicated to the auxiliary communication links 814, 816. As such, the ANF 832 may generate a data message 932 to be sent via the primary communication link 812 during the time slot n+4. The data message 932 may be similarly embodied as data message 918. The data message 932 may be also configured to be transmitted during the data portion 844 of resources 855-c, 855-f, thereby reserving the control portions 842 of those resources to be used by the auxiliary communication links 814, 816. A scheduling message 934 may be transmitted during the control portion 920 of the data message 932.

It should be appreciated from FIGS. 8 and 9 that request and indication messages may be transmitted on control portions of resources 840. For example, the messages may be included in a DL control channel or an UL control channel. These control channels may use resources that are pre-allocated by a (network-wide) resource plan (e.g., the synchronized frame structure). Furthermore, resource shifting via availability/occupancy signaling may be restricted to the data portions 844 of resources 840, while control portions 842 of resources 840 are typically reserved for the assigned communication link. This allows a communication link to sustain regular control signaling even if it has released its resource to adjacent links. Resource shifting may apply to time-multiplexed resources, frequency-multiplexed resources, code division multiplexed resources, spatially multiplexed resources, or combinations thereof. The type of resource that is requested, indicated to be available, or selected may be explicitly included in the corresponding messages. Such information may also be implicitly derived from information an access node holds about the local network topology (e.g., such as the resource plan and the local connectivity). Such information may be provisioned to the access node or configured via additional signaling channels.

Figure 10:
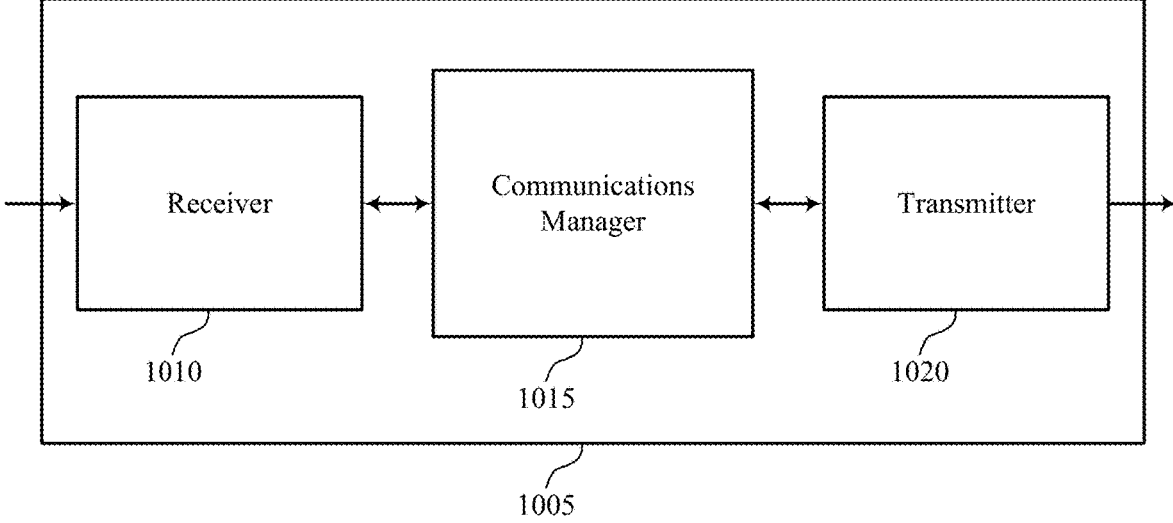
FIGS. 10 through 12 show block diagrams of a device that supports dynamic resource allocation in wireless network in accordance with aspects of the present disclosure.

FIG. 10 shows a block diagram 1000 of a wireless device 1005 that supports dynamic resource allocation in wireless network in accordance with aspects of the present disclosure. Wireless device 1005 may be an example of aspects of a base station 105 as described herein. Wireless device 1005 may include receiver 1010, communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to dynamic resource allocation in wireless network, etc.). Information may be passed on to other components of the device. The receiver 1010 may be an example of aspects of the transceiver 1335 described with reference to FIG. 13. The receiver 1010 may utilize a single antenna or a set of antennas.

Communications manager 1015 may be an example of aspects of the communications manager 1315 described with reference to FIG. 13. Communications manager 1015 and/or at least some of its various sub-components may be implemented in hardware, software executed by a processor, firmware, or any combination thereof. If implemented in software executed by a processor, the functions of the communications manager 1015 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The communications manager 1015 and/or at least some of its various sub-components may be physically located at various positions, including being distributed such that portions of functions are implemented at different physical locations by one or more physical devices. In some examples, communications manager 1015 and/or at least some of its various sub-components may be a separate and distinct component in accordance with various aspects of the present disclosure. In other examples, communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 1015 may instantiate an ANF that requests additional resources in some cases, and may establish a wireless backhaul communications link between a first access node function (ANF) at a first base station and a user equipment function (UEF) at a second base station, identify a need for additional backhaul resources at the first ANF for a first time period, transmit a request message to the UEF indicating that additional backhaul resources are requested at the first ANF, receive an indication of one or more available resources from one or more other ANFs, and select one or more of the available resources for backhaul communications at the first ANF. The communications manager 1015 may also instantiate a UEF in some cases, and establish a wireless backhaul communications link between a first access node function (ANF) at a first base station and the user equipment function (UEF), receive, from the first ANF, a request message indicating that additional backhaul resources are requested at the first ANF, and forward the request message to a second ANF associated with the UEF. The communications manager 1015 may also instantiate an ANF that receives a resource request in some cases, and may establish a wireless backhaul communications link between a first ANF at a first base station and a user equipment function (UEF), receive, from a second ANF, a request message indicating that additional backhaul resources are requested at the second ANF, identify one or more available resources that are responsive to the request message, and transmit a response message to the second ANF that indicates the one or more available resources are available to the second ANF.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
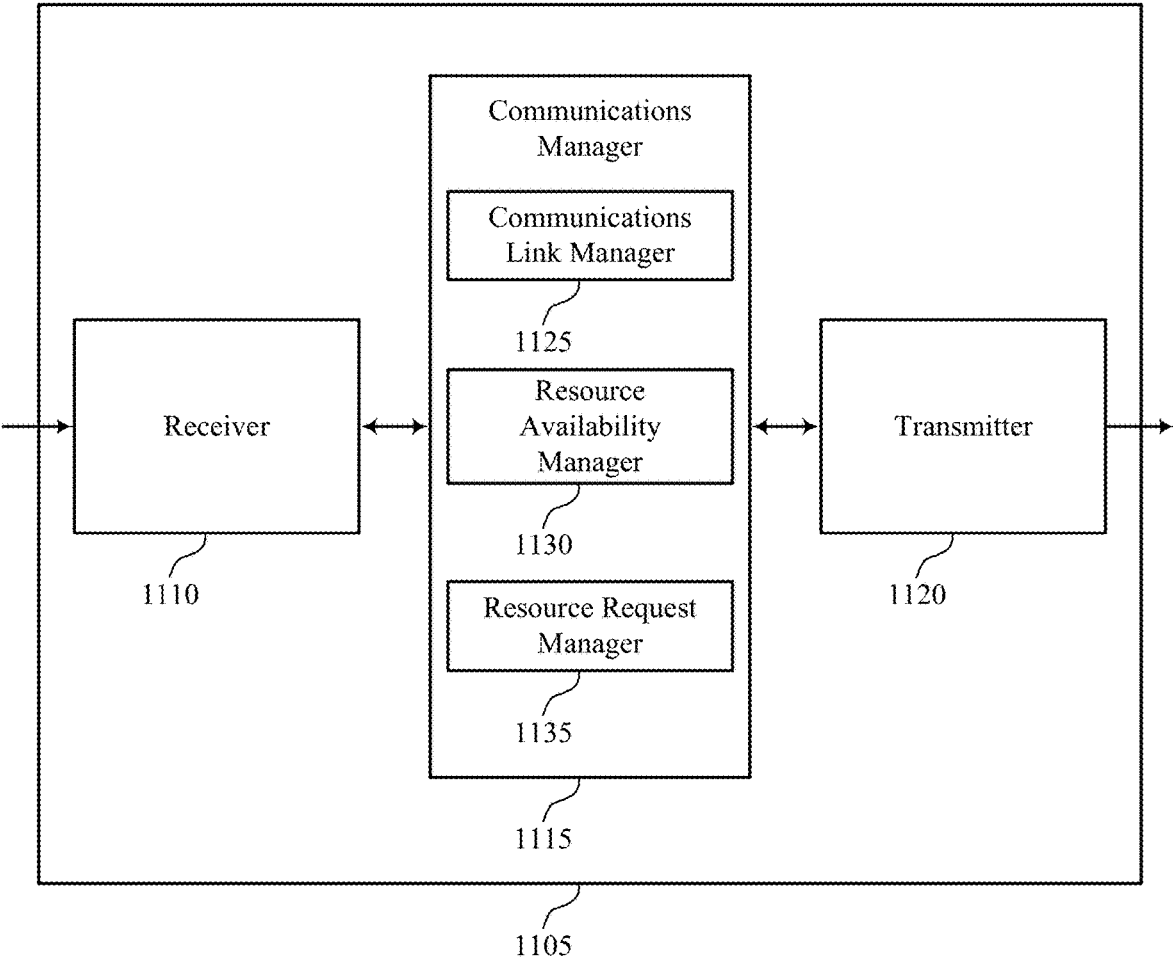

FIG. 11 shows a block diagram 1100 of a wireless device 1105 that supports dynamic resource allocation in wireless network in accordance with aspects of the present disclosure. Wireless device 1105 may be an example of aspects of a wireless device 1005 or a base station 105 as described with reference to FIG. 10. Wireless device 1105 may include receiver 1110, communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to dynamic resource allocation in wireless network, etc.). Information may be passed on to other components of the device. The receiver 1110 may be an example of aspects of the transceiver 1335 described with reference to FIG. 13. The receiver 1110 may utilize a single antenna or a set of antennas.

Communications manager 1115 may be an example of aspects of the communications manager 1315 described with reference to FIG. 13. Communications manager 1115 may also include communications link manager 1125, resource availability manager 1130, and resource request manager 1135.

Communications link manager 1125 may establish a wireless backhaul communications link between an access node function (ANF) and a user equipment function (UEF). The ANF may be an ANF that transmits a request for additional resources, or receives a request for additional resources.

Resource availability manager 1130 may identify, in some cases, a need for additional backhaul resources at the first ANF for a first time period in some cases, and responsive to an indication of available resources from a second ANG, select one or more of the available resources for backhaul communications. In some cases, resource availability manager 1130 may identify one or more available resources that are responsive to a request message and provide an indication of the available resources to another ANF. In some cases, resource availability manager 1130 may receive an indication of selected resources from the other ANF and refrain from transmitting backhaul data using the selected resources.

Resource request manager 1135 may transmit a request message to the UEF indicating that additional backhaul resources are requested at the first ANF, receive, at the first ANF, an indication of one or more available resources from one or more other ANFs, and transmit an indication of the selected resources to one or more other ANFs or UEFs. In some cases, resource request manager 1135 may be associated with a UEF and may receive, from a first ANF, a request message indicating that additional backhaul resources are requested at the first ANF, forward the request message to a second ANF associated with the UEF, receive, from the second ANF, an indication of one or more available resources, forward the indication to the first ANF, receive an indication of the selected resources from the first ANF, and forward the indication of the selected resources to the second ANF. In some cases, the request message includes an indication of a type of resources requested by the first ANF.

In some cases, the request message may be transmitted in a control channel configured in the wireless backhaul communications link. In some cases, the request message is transmitted in an uplink control channel or a downlink control channel. In some cases, the request message is forwarded by the UEF to a second ANF associated with the UEF. In some cases, the forwarding the request message includes determining to forward the request message to the second ANF via a wireless backhaul link with the second ANF or to forward the request message to the second ANF that is collocated with the UEF at a base station. In some cases, the request message includes a request for one or more of time-multiplexed resources, frequency multiplexed resources, code division multiplexed resources, spatially multiplexed resources, or any combination thereof. In some cases, the receiving includes receiving the request message from the UEF, where the UEF is established at a second base station and the second ANF is established at a third base station.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
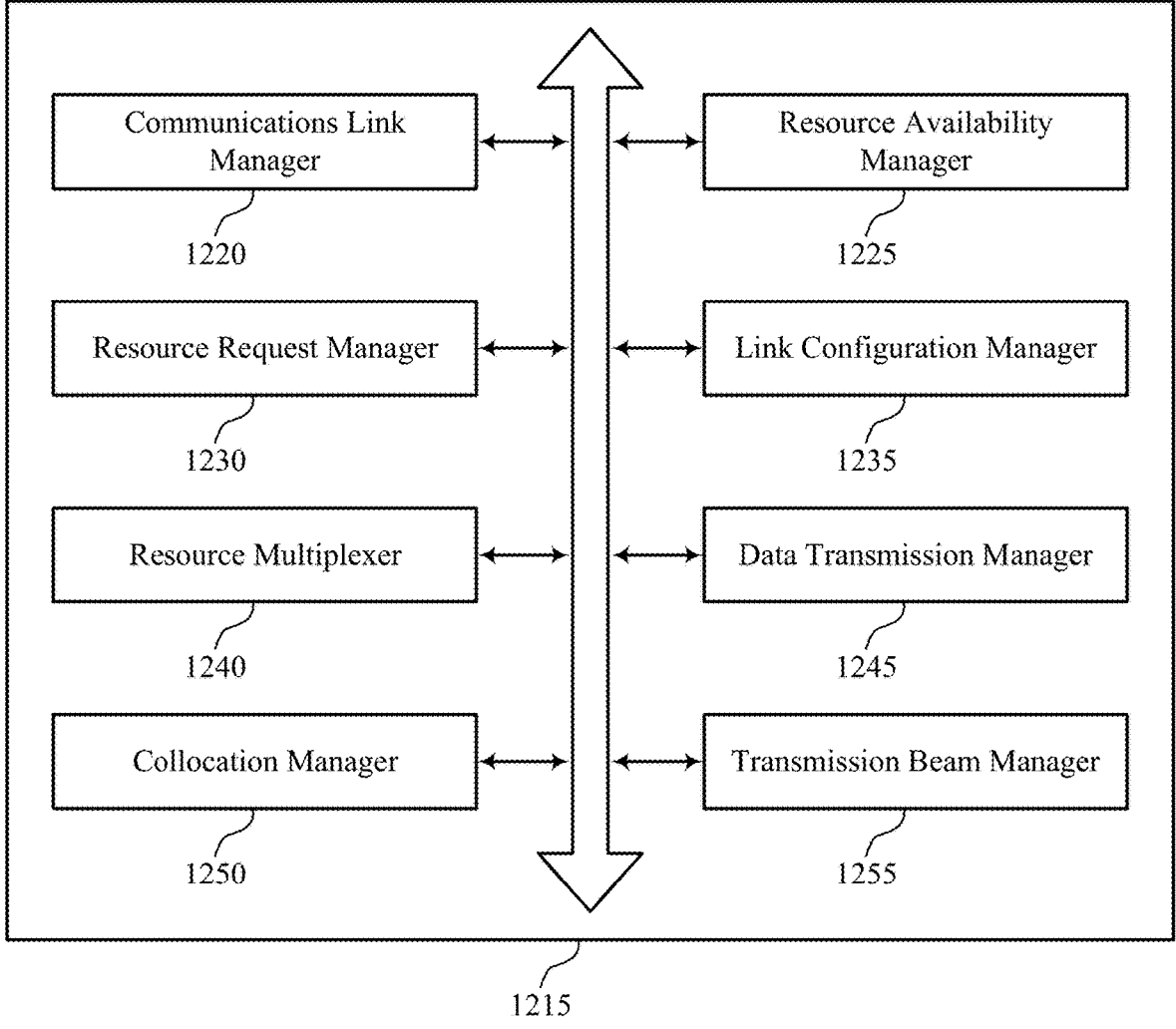

FIG. 12 shows a block diagram 1200 of a communications manager 1215 that supports dynamic resource allocation in wireless network in accordance with aspects of the present disclosure. The communications manager 1215 may be an example of aspects of a communications manager 1015, a communications manager 1115, or a communications manager 1315 described with reference to FIGS. 10, 11, and 13. The communications manager 1215 may include communications link manager 1220, resource availability manager 1225, resource request manager 1230, link configuration manager 1235, resource multiplexer 1240, data transmission manager 1245, collocation manager 1250, and transmission beam manager 1255. Each of these modules may communicate, directly or indirectly, with one another (e.g., via one or more buses).

Communications link manager 1220 may establish a wireless backhaul communications link between an access node function (ANF) and a user equipment function (UEF). The ANF may be an ANF that transmits a request for additional resources, or receives a request for additional resources.

Resource availability manager 1225 may identify, in some cases, a need for additional backhaul resources at the first ANF for a first time period in some cases, and responsive to an indication of available resources from a second ANF, select one or more of the available resources for backhaul communications. In some cases, resource availability manager 1225 may identify one or more available resources that are responsive to a request message and provide an indication of the available resources to another ANF. In some cases, resource availability manager 1225 may receive an indication of selected resources from the other ANF and refrain from transmitting backhaul data using the selected resources.

Resource request manager 1230 may transmit a request message to the UEF indicating that additional backhaul resources are requested at the first ANF, receive, at the first ANF, an indication of one or more available resources from one or more other ANFs, and transmit an indication of the selected resources to one or more other ANFs or UEFs. In some cases, resource request manager 1230 may be associated with a UEF and may receive, from a first ANF, a request message indicating that additional backhaul resources are requested at the first ANF, forward the request message to a second ANF associated with the UEF, receive, from the second ANF, an indication of one or more available resources, forward the indication to the first ANF, receive an indication of the selected resources from the first ANF, and forward the indication of the selected resources to the second ANF. In some cases, the request message includes an indication of a type of resources requested by the first ANF.

In some cases, the request message may be transmitted in a control channel configured in the wireless backhaul communications link. In some cases, the request message is transmitted in an uplink control channel or a downlink control channel. In some cases, the request message is forwarded by the UEF to a second ANF associated with the UEF. In some cases, the forwarding the request message includes determining to forward the request message to the second ANF via a wireless backhaul link with the second ANF or to forward the request message to the second ANF that is collocated with the UEF at a base station. In some cases, the request message includes a request for one or more of time-multiplexed resources, frequency multiplexed resources, code division multiplexed resources, spatially multiplexed resources, or any combination thereof. In some cases, the receiving includes receiving the request message from the UEF, where the UEF is established at a second base station and the second ANF is established at a third base station.

Link configuration manager 1235 may configure a control channel that includes resources that are pre-allocated among a set of ANFs and a set of UEFs. In some cases, the request message is received on an uplink control channel or a downlink control channel configured in the wireless backhaul communications link.

Resource multiplexer 1240 may select one or more of the available resources such as by selecting one or more of time-multiplexed resources, frequency multiplexed resources, code division multiplexed resources, spatially multiplexed resources, or any combination thereof. In some cases, the available resources include resources on one or more directional transmission beams, and where the spatially multiplexed resource include resources on one or more of the directional transmission beams. Data transmission manager 1245 may transmit backhaul data using the one or more selected resources.

Collocation manager 1250 may identify a collocated ANFs or UEFs and transmit messages between collocated ANFs and UEFs. Transmission beam manager 1255 may configure transmission beams of a base station. In some cases, the requested resources include resources on one or more directional transmission beams, and spatially multiplexed resource include resources multiplexed on one or more of the directional transmission beams.

Figure 13:
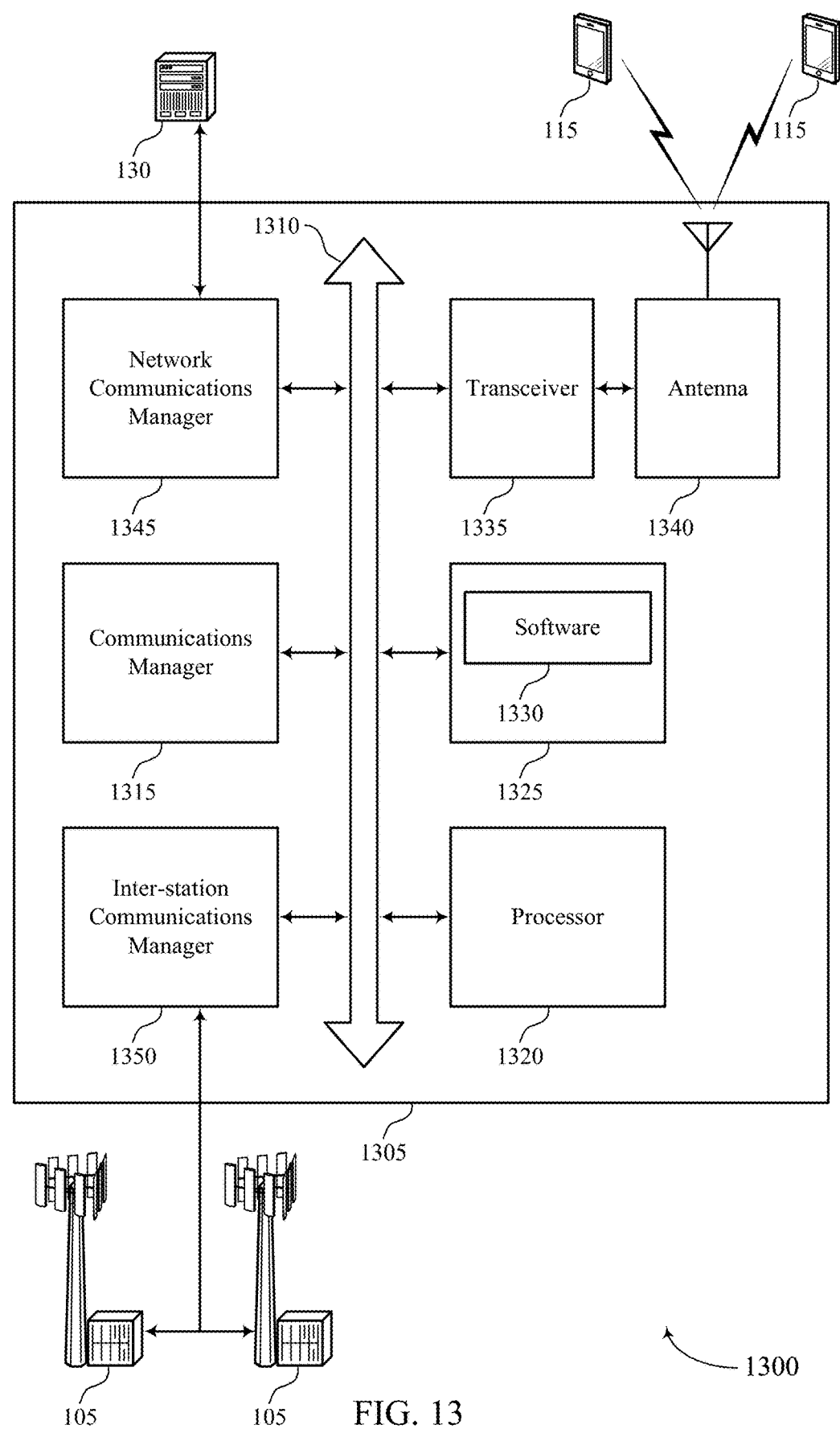
FIG. 13 illustrates a block diagram of a system including a base station that supports dynamic resource allocation in wireless network in accordance with aspects of the present disclosure.

FIG. 13 shows a diagram of a system 1300 including a device 1305 that supports dynamic resource allocation in wireless network in accordance with aspects of the present disclosure. Device 1305 may be an example of or include the components of wireless device 1005, wireless device 1105, or a base station 105 as described above, e.g., with reference to FIGS. 10 and 11. Device 1305 may include components for bi-directional voice and data communications including components for transmitting and receiving communications, including communications manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting dynamic resource allocation in wireless network).

Memory 1325 may include random access memory (RAM) and read only memory (ROM). The memory 1325 may store computer-readable, computer-executable software 1330 including instructions that, when executed, cause the processor to perform various functions described herein. In some cases, the memory 1325 may contain, among other things, a basic input/output system (BIOS) which may control basic hardware or software operation such as the interaction with peripheral components or devices.

Software 1330 may include code to implement aspects of the present disclosure, including code to support dynamic resource allocation in wireless network. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base station 105, and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within a Long Term Evolution (LTE)/LTE-A wireless communication network technology to provide communication between base stations 105.

FIG. 14 shows a flowchart illustrating a method 1400 for dynamic resource allocation in wireless network in accordance with aspects of the present disclosure. The operations of method 1400 may be implemented by a base station 105 or its components as described herein. For example, the operations of method 1400 may be performed by a communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 1405 the base station 105 may establish a wireless backhaul communications link between a first access node function (ANF) at a first base station and a user equipment function (UEF) at a second base station. The operations of block 1405 may be performed according to the methods described herein. In certain examples, aspects of the operations of block 1405 may be performed by a communications link manager as described with reference to FIGS. 10 through 13.

At block 1410 the base station 105 may identify, at the first ANF, a need for additional backhaul resources at the first ANF for a first time period. The operations of block 1410 may be performed according to the methods described herein. In certain examples, aspects of the operations of block 1410 may be performed by a resource availability manager as described with reference to FIGS. 10 through 13.

At block 1415 the base station 105 may transmit a request message to the UEF indicating that additional backhaul resources are requested at the first ANF. The operations of block 1415 may be performed according to the methods described herein. In certain examples, aspects of the operations of block 1415 may be performed by a resource request manager as described with reference to FIGS. 10 through 13.

At block 1420 the base station 105 may receive, at the first ANF, an indication of one or more available resources from one or more other ANFs. The operations of block 1420 may be performed according to the methods described herein. In certain examples, aspects of the operations of block 1420 may be performed by a resource request manager as described with reference to FIGS. 10 through 13.

At block 1425 the base station 105 may select one or more of the available resources for backhaul communications at the first ANF. The operations of block 1425 may be performed according to the methods described herein. In certain examples, aspects of the operations of block 1425 may be performed by a resource availability manager as described with reference to FIGS. 10 through 13.

FIG. 15 shows a flowchart illustrating a method 1500 for dynamic resource allocation in wireless network in accordance with aspects of the present disclosure. The operations of method 1500 may be implemented by a base station 105 or its components as described herein. For example, the operations of method 1500 may be performed by a communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 1505 the base station 105 may establish a wireless backhaul communications link between a first access node function (ANF) at a first base station and a user equipment function (UEF) at a second base station. The operations of block 1505 may be performed according to the methods described herein. In certain examples, aspects of the operations of block 1505 may be performed by a communications link manager as described with reference to FIGS. 10 through 13.

At block 1510 the base station 105 may identify, at the first ANF, a need for additional backhaul resources at the first ANF for a first time period. The operations of block 1510 may be performed according to the methods described herein. In certain examples, aspects of the operations of block 1510 may be performed by a resource availability manager as described with reference to FIGS. 10 through 13.

At block 1515 the base station 105 may transmit a request message to the UEF indicating that additional backhaul resources are requested at the first ANF. The operations of block 1515 may be performed according to the methods described herein. In certain examples, aspects of the operations of block 1515 may be performed by a resource request manager as described with reference to FIGS. 10 through 13.

At block 1520 the base station 105 may receive, at the first ANF, an indication of one or more available resources from one or more other ANFs. The operations of block 1520 may be performed according to the methods described herein. In certain examples, aspects of the operations of block 1520 may be performed by a resource request manager as described with reference to FIGS. 10 through 13.

At block 1525 the base station 105 may select one or more of the available resources for backhaul communications at the first ANF. The operations of block 1525 may be performed according to the methods described herein. In certain examples, aspects of the operations of block 1525 may be performed by a resource availability manager as described with reference to FIGS. 10 through 13.

At block 1530 the base station 105 may transmit an indication of the selected resources to one or more other ANFs or UEFs. The operations of block 1530 may be performed according to the methods described herein. In certain examples, aspects of the operations of block 1530 may be performed by a resource request manager as described with reference to FIGS. 10 through 13.

At block 1535 the base station 105 may transmit backhaul data using the one or more selected resources. The operations of block 1535 may be performed according to the methods described herein. In certain examples, aspects of the operations of block 1535 may be performed by a data transmission manager as described with reference to FIGS. 10 through 13.

FIG. 16 shows a flowchart illustrating a method 1600 for dynamic resource allocation in wireless network in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 1605 the base station 105 may establish a wireless backhaul communications link between a first access node function (ANF) at a first base station and a user equipment function (UEF) at a second base station. The operations of block 1605 may be performed according to the methods described herein. In certain examples, aspects of the operations of block 1605 may be performed by a communications link manager as described with reference to FIGS. 10 through 13.

At block 1610 the base station 105 may receive, at the UEF, from the first ANF, a request message indicating that additional backhaul resources are requested at the first ANF. The operations of block 1610 may be performed according to the methods described herein. In certain examples, aspects of the operations of block 1610 may be performed by a resource request manager as described with reference to FIGS. 10 through 13.

At block 1615 the base station 105 may forward the request message to a second ANF associated with the UEF. The operations of block 1615 may be performed according to the methods described herein. In certain examples, aspects of the operations of block 1615 may be performed by a resource request manager as described with reference to FIGS. 10 through 13.

Figure 17:
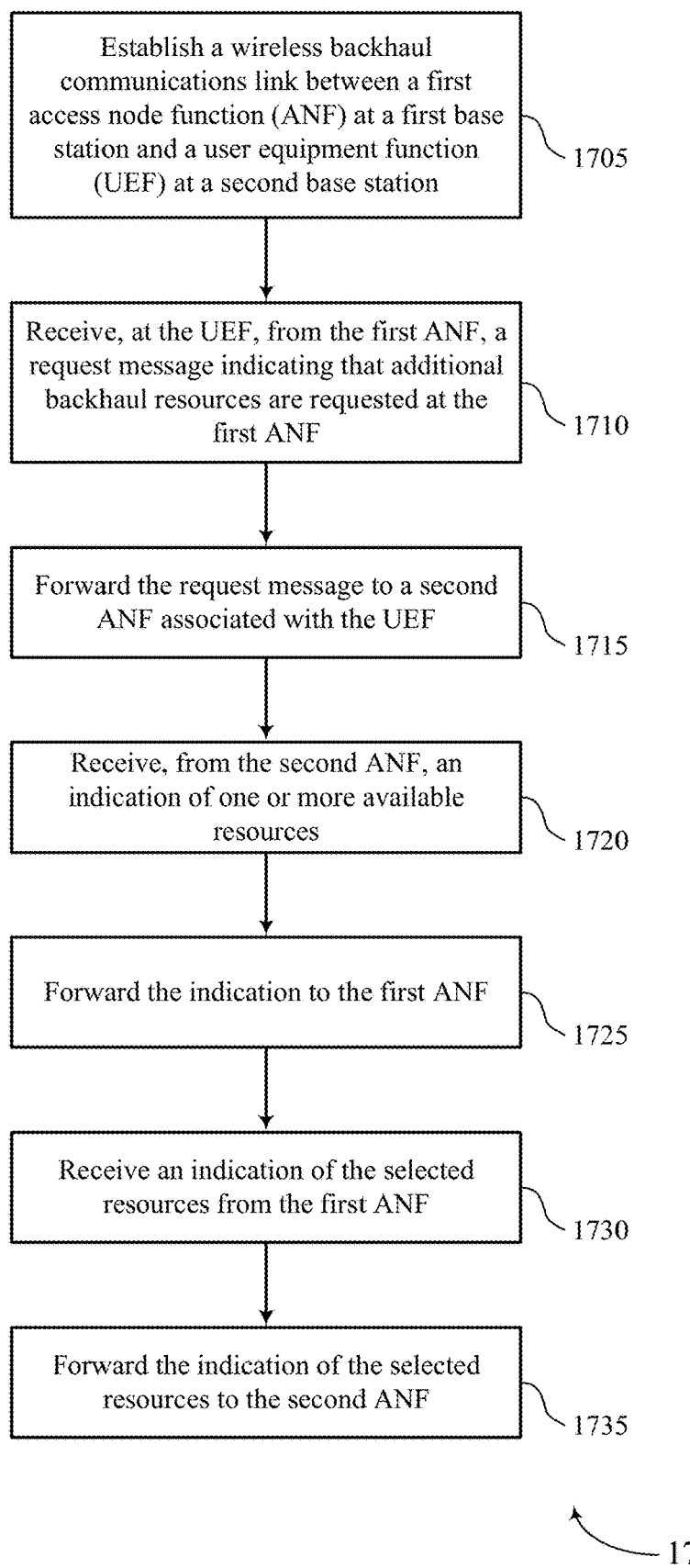

FIG. 17 shows a flowchart illustrating a method 1700 for dynamic resource allocation in wireless network in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 1705 a UEF at a second base station 105 may establish a wireless backhaul communications link between a first access node function (ANF) at a first base station and the UEF at the second base station. The operations of block 1705 may be performed according to the methods described herein. In certain examples, aspects of the operations of block 1705 may be performed by a communications link manager as described with reference to FIGS. 10 through 13.

At block 1710 the second base station 105 may receive, at the UEF, from the first ANF, a request message indicating that additional backhaul resources are requested at the first ANF. The operations of block 1710 may be performed according to the methods described herein. In certain examples, aspects of the operations of block 1710 may be performed by a resource request manager as described with reference to FIGS. 10 through 13.

At block 1715 the UEF at the second base station 105 may forward the request message to a second ANF associated with the UEF. The operations of block 1715 may be performed according to the methods described herein. In certain examples, aspects of the operations of block 1715 may be performed by a resource request manager as described with reference to FIGS. 10 through 13.

At block 1720 the UEF at the second base station 105 may receive, from the second ANF, an indication of one or more available resources. The operations of block 1720 may be performed according to the methods described herein. In certain examples, aspects of the operations of block 1720 may be performed by a resource request manager as described with reference to FIGS. 10 through 13.

At block 1725 the UEF at the second base station 105 may forward the indication to the first ANF. The operations of block 1725 may be performed according to the methods described herein. In certain examples, aspects of the operations of block 1725 may be performed by a resource request manager as described with reference to FIGS. 10 through 13.

At block 1730 the UEF at the second base station 105 may receive an indication of the selected resources from the first ANF. The operations of block 1730 may be performed according to the methods described herein. In certain examples, aspects of the operations of block 1730 may be performed by a resource request manager as described with reference to FIGS. 10 through 13.

At block 1735 the UEF at the base station 105 may forward the indication of the selected resources to the second ANF. The operations of block 1735 may be performed according to the methods described herein. In certain examples, aspects of the operations of block 1735 may be performed by a resource request manager as described with reference to FIGS. 10 through 13.

FIG. 18 shows a flowchart illustrating a method 1800 for dynamic resource allocation in wireless network in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 1805 the base station 105 may establish a wireless backhaul communications link between a first access node function (ANF) at the base station and a user equipment function (UEF). The operations of block 1805 may be performed according to the methods described herein. In certain examples, aspects of the operations of block 1805 may be performed by a communications link manager as described with reference to FIGS. 10 through 13.

At block 1810 the base station 105 may receive, from a second ANF, a request message indicating that additional backhaul resources are requested at the second ANF. The operations of block 1810 may be performed according to the methods described herein. In certain examples, aspects of the operations of block 1810 may be performed by a resource request manager as described with reference to FIGS. 10 through 13.

At block 1815 the base station 105 may identify, at the first ANF, one or more available resources that are responsive to the request message. The operations of block 1815 may be performed according to the methods described herein. In certain examples, aspects of the operations of block 1815 may be performed by a resource availability manager as described with reference to FIGS. 10 through 13.

At block 1820 the base station 105 may transmit a response message to the second ANF that indicates the one or more available resources are available to the second ANF. The operations of block 1820 may be performed according to the methods described herein. In certain examples, aspects of the operations of block 1820 may be performed by a resource request manager as described with reference to FIGS. 10 through 13.

Figure 19:
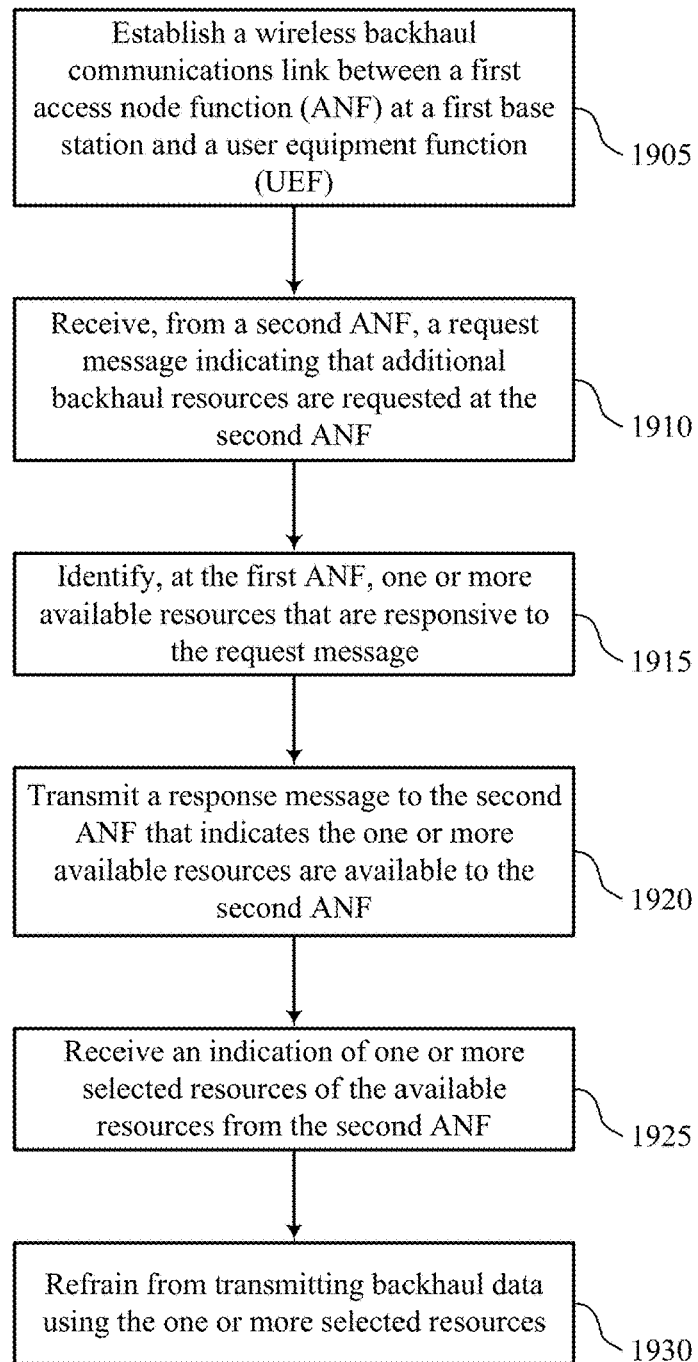

FIG. 19 shows a flowchart illustrating a method 1900 for dynamic resource allocation in wireless network in accordance with aspects of the present disclosure. The operations of method 1900 may be implemented by a first base station 105 or its components as described herein. For example, the operations of method 1900 may be performed by a communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 1905 the first base station 105 may establish a wireless backhaul communications link between a first access node function (ANF) at the first base station and a user equipment function (UEF). The operations of block 1905 may be performed according to the methods described herein. In certain examples, aspects of the operations of block 1905 may be performed by a communications link manager as described with reference to FIGS. 10 through 13.

At block 1910 the first base station 105 may receive, from a second ANF, a request message indicating that additional backhaul resources are requested at the second ANF. The operations of block 1910 may be performed according to the methods described herein. In certain examples, aspects of the operations of block 1910 may be performed by a resource request manager as described with reference to FIGS. 10 through 13.

At block 1915 the first base station 105 may identify, at the first ANF, one or more available resources that are responsive to the request message. The operations of block 1915 may be performed according to the methods described herein. In certain examples, aspects of the operations of block 1915 may be performed by a resource availability manager as described with reference to FIGS. 10 through 13.

At block 1920 the first base station 105 may transmit a response message to the second ANF that indicates the one or more available resources are available to the second ANF. The operations of block 1920 may be performed according to the methods described herein. In certain examples, aspects of the operations of block 1920 may be performed by a resource request manager as described with reference to FIGS. 10 through 13.

At block 1925 the first base station 105 may receive an indication of one or more selected resources of the available resources from the second ANF. The operations of block 1925 may be performed according to the methods described herein. In certain examples, aspects of the operations of block 1925 may be performed by a resource request manager as described with reference to FIGS. 10 through 13.

At block 1930 the first base station 105 may refrain from transmitting backhaul data using the one or more selected resources. The operations of block 1930 may be performed according to the methods described herein. In certain examples, aspects of the operations of block 1930 may be performed by a resource availability manager as described with reference to FIGS. 10 through 13.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (CNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and backhaul network 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a first access node in an integrated access and backhaul (IAB) network, comprising:
   one or more memories; and
   one or more processors coupled with the one or more memories and configured to cause the apparatus to:
      receive, via first signaling, a plurality of resources that are pre-allocated among a plurality of access nodes in the IAB network, wherein the first access node comprises a first node function and a second node function different from the first node function; and
      receive, at the first node function of the first access node and via second signaling from a second access node, an availability indication of one or more available resources for communication from the plurality of resources, wherein the one or more available resources correspond to frequency-multiplexed resources and are available for a period of time for communication with an additional node associated with the IAB network, wherein the plurality of access nodes includes the first access node and the second access node, and wherein the first signaling is different from the second signaling.

2. The apparatus of claim 1, wherein the plurality of resources that are pre-allocated is received via radio resource control (RRC) signaling.

3. The apparatus of claim 1, wherein the availability indication of the one or more available resources is received via a downlink control channel.

4. The apparatus of claim 1, wherein the one or more available resources further correspond to time-multiplexed resources, spatially-multiplexed resources, or a combination thereof.

5. The apparatus of claim 1, wherein the one or more processors are further configured to cause the apparatus to:
   select at least one resource from the one or more available resources; and
   transmit data using the at least one resource.

6. The apparatus of claim 5, wherein the one or more processors are further configured to cause the apparatus to:
   select the at least one resource based at least in part on managing inter-link interference or on inter-node beam coordination.

7. The apparatus of claim 1, wherein the one or more processors are further configured to cause the apparatus to:

forward, from the second node function of the first access node, the availability indication to one or more other access nodes associated with the IAB network.

8. The apparatus of claim 1, wherein the one or more processors are further configured to cause the apparatus to:
restrict resource shifting of at least one resource from the plurality of resources that are pre-allocated.

9. The apparatus of claim 1, wherein the plurality of resources that are pre-allocated comprises at least one resource associated with a directional beam.

10. The apparatus of claim 1, wherein the availability indication of the one or more available resources is received from an access node function (ANF) of the second access node, wherein the second access node is the additional node.

11. The apparatus of claim 1, wherein the first node function comprises a user equipment function (UEF) and the second node function comprises an access node function (ANF).

12. The apparatus of claim 1, wherein the first access node comprises a first base station and the second access node comprises a second base station.

13. A method for wireless communication at a first access node in an integrated access and backhaul (IAB) network, comprising:
receiving, by the first access node and via first signaling, a plurality of resources that are pre-allocated among a plurality of access nodes in the IAB network, wherein the first access node comprises a first node function and a second node function different from the first node function; and
receiving, at the first node function of the first access node and via second signaling from a second access node, an availability indication of one or more available resources for communication from the plurality of resources, wherein the one or more available resources correspond to frequency-multiplexed resources and are available for a period of time a for communication with an additional node associated with the IAB network, wherein the plurality of access nodes includes the first access node and the second access node, and wherein the first signaling is different from the second signaling.

14. The method of claim 13, wherein the availability indication comprises an indication that the one or more available resources further correspond to time-multiplexed resources, spatially-multiplexed resources, or a combination thereof.

15. The method of claim 13, further comprising:
selecting, based at least in part on managing inter-link interference or on inter-node beam coordination, at least one resource from the one or more available resources; and
transmitting data using the at least one resource.

16. The method of claim 13, further comprising:
forwarding, from the second node function of the first access node, the availability indication to one or more other access nodes associated with the IAB network.

17. The method of claim 13, further comprising:
restricting resource shifting of at least one resource from the plurality of resources that are pre-allocated.

18. A non-transitory computer-readable medium storing code for wireless communication at a first access node in an integrated access and backhaul (IAB) network, the code comprising instructions executable by one or more processors to:
receive, by the first access node and via first signaling, a plurality of resources that are pre-allocated among a plurality of access nodes in the IAB network, wherein the first access node comprises a first node function and a second node function different from the first node function; and
receive, at the first node function of the first access node and via second signaling from a second access node, an availability indication of one or more available resources for communication from the plurality of resources, wherein the one or more available resources correspond to frequency-multiplexed resources and are available for a period of time for communication with an additional node associated with the IAB network, wherein the plurality of access nodes includes the first access node and the second access node, and wherein the first signaling is different from the second signaling.

19. The non-transitory computer-readable medium of claim 18, wherein the plurality of resources that are pre-allocated is received via radio resource control (RRC) signaling.

20. The non-transitory computer-readable medium of claim 18, wherein the availability indication of the one or more available resources is received via a downlink control channel.

*     *     *     *     *